(12) United States Patent
Zaccaria

(10) Patent No.: US 10,355,736 B2
(45) Date of Patent: Jul. 16, 2019

(54) ANTI-GLARE SHADE, PRIVACY HOOD AND PROTECTIVE COVER FOR MOBILE ELECTRONIC DEVICES

(71) Applicant: Nathan J. Zaccaria, Long Branch, NJ (US)

(72) Inventor: Nathan J. Zaccaria, Long Branch, NJ (US)

(\*) Notice: Subject to any disclaimer, the term of this patent is extended or adjusted under 35 U.S.C. 154(b) by 0 days.

(21) Appl. No.: 16/206,561

(22) Filed: Nov. 30, 2018

(65) Prior Publication Data

US 2019/0097669 A1 Mar. 28, 2019

Related U.S. Application Data

(63) Continuation-in-part of application No. 15/694,781, filed on Sep. 2, 2017, now Pat. No. 10,154,127.

(60) Provisional application No. 62/547,775, filed on Aug. 19, 2017.

(51) Int. Cl.
| | |
|---|---|
| H04M 1/00 | (2006.01) |
| H04B 1/3888 | (2015.01) |
| A45C 11/00 | (2006.01) |
| H04M 1/02 | (2006.01) |
| H04M 1/21 | (2006.01) |
| H04M 1/04 | (2006.01) |
| H04M 1/22 | (2006.01) |

(52) U.S. Cl.
CPC .......... H04B 1/3888 (2013.01); A45C 11/00 (2013.01); H04M 1/0266 (2013.01); H04M 1/21 (2013.01); A45C 2011/002 (2013.01); H04M 1/04 (2013.01); H04M 1/22 (2013.01)

(58) Field of Classification Search
CPC .... H04B 1/3888; H04M 1/185; G06F 1/1639; G06F 1/1647
USPC ...................................................... 455/575.8
See application file for complete search history.

(56) References Cited

U.S. PATENT DOCUMENTS

| | | |
|---|---|---|
| 2,654,173 A | 10/1953 | Christensen |
| 5,218,474 A | 6/1993 | Kirschner |
| 5,508,757 A | 4/1996 | Chen |
| 5,877,896 A * | 3/1999 | Gremban ............... G06F 1/1603 348/842 |

(Continued)

OTHER PUBLICATIONS http://www.banggood.com/Sun-Hood-Sun-Shade-for-DJI-Phantom-2-Vision-Vision-FC40-p-939698.html; Jun. 19, 2015 printout.

(Continued)

*Primary Examiner* — Tu X Nguyen
(74) *Attorney, Agent, or Firm* — Walter J. Tencza, Jr.

(57) ABSTRACT

An apparatus including a first central section, a second central section, a left side wall, and a right side wall. The first and second central sections, the left side wall, and the right side wall may be attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section.

28 Claims, 28 Drawing Sheets

(56) References Cited

U.S. PATENT DOCUMENTS

| | | | |
|---|---|---|---|
| 6,144,419 | A | 11/2000 | Schmidt |
| 6,302,546 | B1 | 10/2001 | Kordiak |
| 6,536,655 | B1 | 3/2003 | Humphrey |
| 8,919,549 | B1 | 12/2014 | Tashjian |
| 9,022,341 | B2 | 5/2015 | Radmard |
| 9,235,230 | B1 * | 1/2016 | Tarnow .................... G06F 1/16 |
| 9,351,415 | B2 | 5/2016 | Zaccaria |
| 2004/0206645 | A1 | 10/2004 | Roubanis |
| 2011/0203955 | A1 | 8/2011 | Fasula |
| 2014/0061084 | A1 * | 3/2014 | Westrup ................. A45C 13/02 |
| | | | 206/472 |
| 2014/0152034 | A1 * | 6/2014 | Tussy .................... F16M 13/04 |
| | | | 294/142 |
| 2016/0088752 | A1 * | 3/2016 | Zaccaria .............. A45C 7/0036 |
| | | | 348/376 |
| 2016/0211877 | A1 * | 7/2016 | Poon .................... H04B 1/3888 |
| 2017/0322590 | A1 * | 11/2017 | Jacobs ................. H04B 1/3888 |

OTHER PUBLICATIONS http://www.amazon.com/iclipse-the-sunshade-for-iPad/dp/B0060YBE8C/ref=pd_sxp_redirect.
http://www.amazon.com/LILLIPUT-Sunhood-Sunshade-Monitor-VIVITEQ/dp/B00HG1GHRG.
http://www.hoodivision.com/#!products/cuou.
http://www.amazon.com/Cellphone-Monitor-Sunshade-Transmitters-Suitable/dp/B00LXD33EI.

* cited by examiner

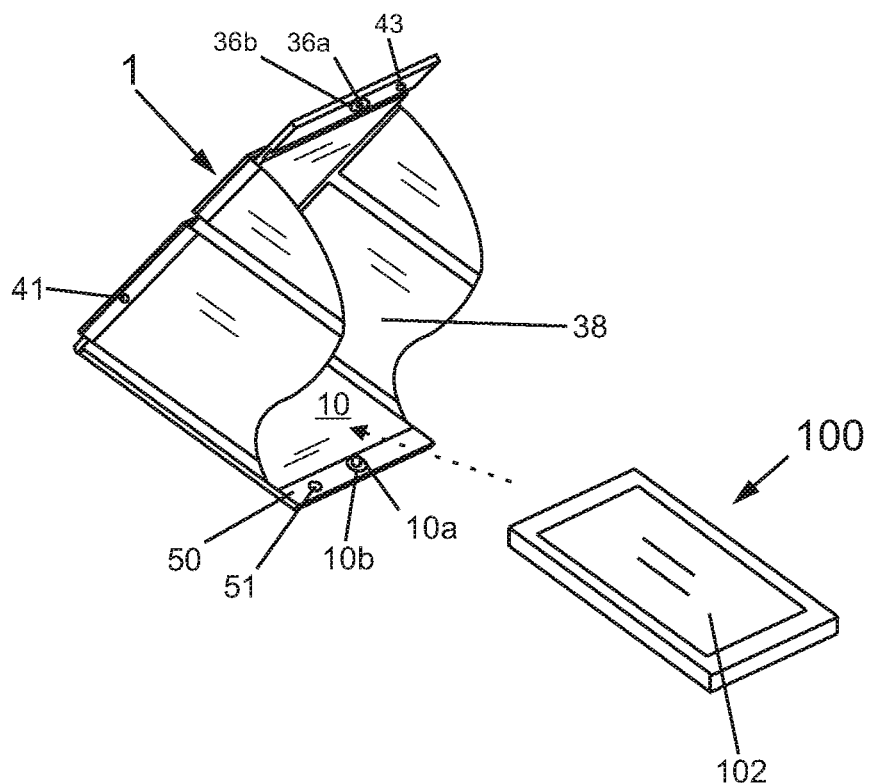
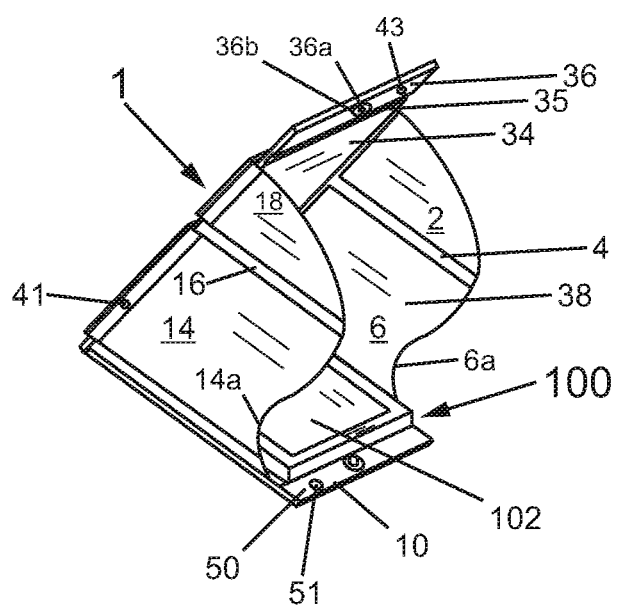

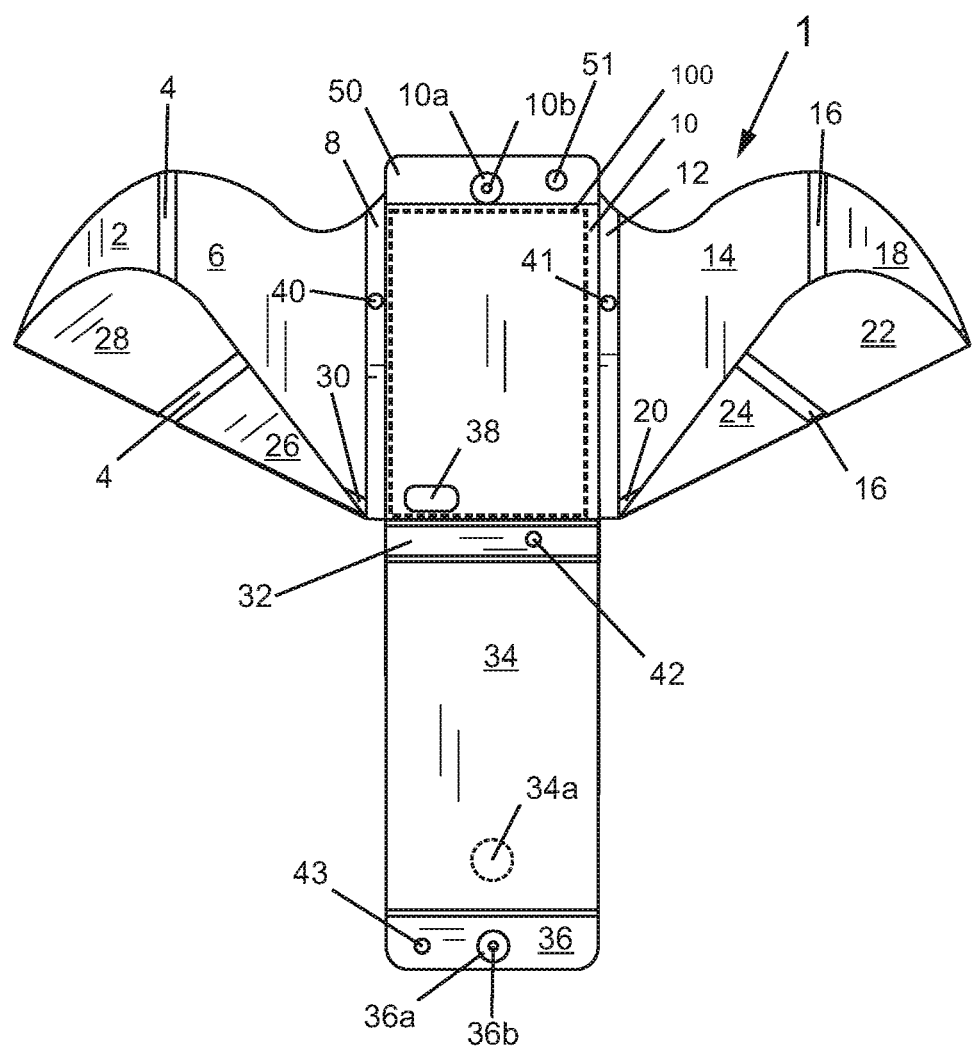

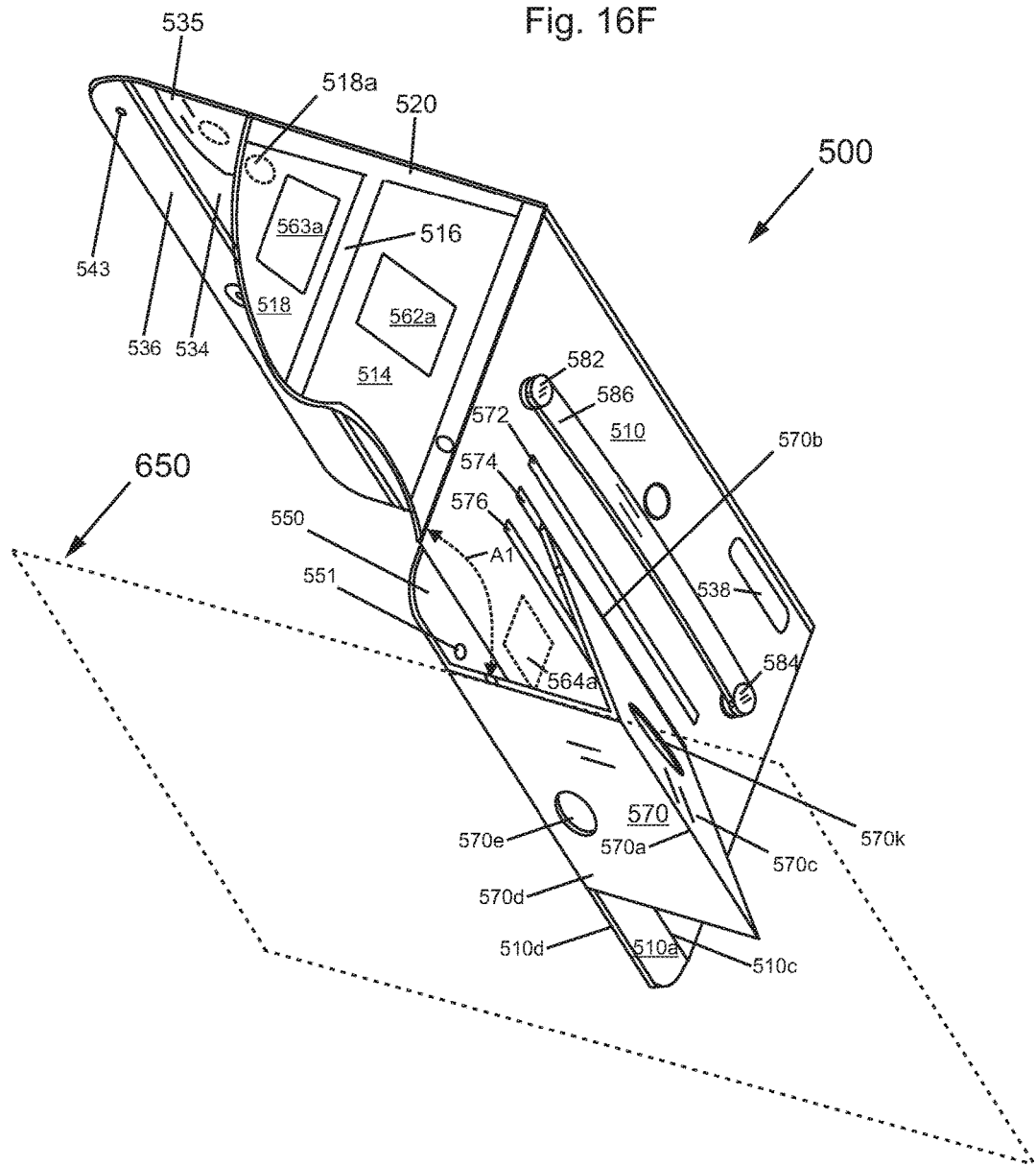

ANTI-GLARE SHADE, PRIVACY HOOD AND PROTECTIVE COVER FOR MOBILE ELECTRONIC DEVICES

CROSS REFERENCE TO RELATED APPLICATION(S)

This application is a continuation in part of and claims the priority of U.S. patent application Ser. No. 15/694,781, filed on Sep. 2, 2017, which claims the priority of provisional patent application, Ser. No. 62/547,775, filed on Aug. 19, 2017, inventor and applicant Nathan J. Zaccaria, titled "ANTI-GLARE SHADE, PRIVACY HOOD AND PROTECTIVE COVER FOR MOBILE ELECTRONIC DEVICES".

FIELD OF THE INVENTION

This invention relates to accessories for use with mobile electronic devices

BACKGROUND OF THE INVENTION

There are various known accessories related to mobile electronic devices. A shading device for a handheld electronics device is shown in U.S. Pat. No. 9,351,415, to the present inventor, Nathan J. Zaccaria, issued on May 24, 2016, which is incorporated by reference herein.

SUMMARY OF THE INVENTION

In at least one embodiment, an apparatus is provided comprising: a first central section, a second central section, a left side wall, and a right side wall. The first central section, the second central section, the left side wall, and the right side wall may be attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section.

The first central section may be at an angle of about seventy degrees with respect to the second central section in the first assembled state. The apparatus may be configured so that the apparatus can alternately be placed in a flat state, in which the first central section, the second central section, the left side wall, and the right side wall are located in one plane or placed in the first assembled state. The left side wall may be attached along a first linear section to a first folding section, wherein the first linear section is at an angle of less than ninety with respect to the first central section, in the flat state. The right side wall may be attached along a second linear section to a second folding section, wherein the second linear section is at an angle of less than ninety degrees with respect to the first central section, in the flat state.

The first folding section may attach to the second central section, and the left side wall is at approximately a ninety degree angle with respect to the first folding section, when the apparatus is in the first assembled state; and the second folding section may attach to the second central section, and the right side wall is at approximately a ninety degree angle with respect to the second folding section, when the apparatus is in the first assembled state.

The first linear section may be made of a thinner material than a majority of the left side wall, and the second linear section may be made of a thinner material than a majority of the right side wall.

The left side wall may be attached along a first linear section to the first central section; wherein the first linear section has a length, a width, and a depth, wherein the length of the first linear section is substantially greater than the width of the first linear section, and the width of the first linear section is greater than the depth of the first linear section; and wherein the first linear section is parallel to the first central section, and wherein the first linear section has a first opening having a diameter less than the width of the first linear section.

The right side wall may be attached along a second linear section to the first central section; wherein the second linear section has a length, a width, and a depth, wherein the length of the second linear section is substantially greater than the width of the second linear section, and the width of the second linear section is greater than the depth of the second linear section; and wherein the second linear section is parallel to the first central section, and wherein the second linear section has a second opening having a diameter less than the width of the second linear section.

In at least one embodiment, at least part of the left side wall is attached along a third linear section to a third folding section, wherein the third linear section is at an angle of less than ninety degrees with respect to the first central section, in the flat state, which is different from the angle of the first linear section with respect to the first central section in the flat state; wherein at least part of the right side wall is attached along a fourth fold line to a fourth linear section, wherein the fourth linear section is at an angle of less than ninety degrees with respect to the first central section, in the flat state, which is different from the angle of the second linear section with respect to the central section in the flat state; wherein the third linear section attaches to the second central section, and the at least part of the left side wall is at approximately a ninety degree angle with respect to the third linear section, when the apparatus is in a second assembled state which is different from the first assembled state; and wherein the fourth linear section attaches to the second central section, and at least part of the right side wall is at approximately a ninety degree angle with respect to the fourth folding section, when the apparatus is in the second assembled state.

In at least one embodiment, the first central section includes a first attachment device; wherein the second central section includes a second attachment device; and wherein the first and second attachment devices are configured to temporarily attach to each other to thereby temporarily attach the first central section and the second central section together in a closed state in which the first central section is substantially aligned and substantially parallel with the second central section, and the left side wall and the right side wall are located in between the first central section and the second central section.

The apparatus may be configured so that the mobile electronics device can remain on the first central section, substantially aligned and substantially parallel to the first central section, covered by the left side wall, and the right side wall, and the second central section, when the apparatus is in the closed state.

The left side wall may be divided by a first linear section which is parallel to the first central section, and the first linear section allows the left side wall to be easily folded along the first linear section; and the right side wall may be divided by a second linear section, which is parallel to the first central section, and the second linear section allows the right side wall to be easily folded along the second linear section.

Each of the left side wall, the right side wall, the first central section, and the second central section may include a pocket for holding an item.

The second central section may be attached along a first linear section to the first central section; wherein the first linear section has a length, a width, and a depth, wherein the length of the first linear section is substantially greater than the width of the first linear section, and the width of the first linear section is greater than the depth of the first linear section; and wherein the first linear section is parallel to the first central section, and wherein the first linear section has a first opening having a diameter less than the width of the first linear section.

The first central section may include a retainer section which takes up less than a majority of the first central section, and which is thicker in depth than a remainder of the first central section, and is configured to inhibit the mobile electronics device from sliding off of the first central section.

The first folding section may encompass a first area; wherein the first folding section includes a first magnetic attraction device, wherein the first magnetic attraction device encompasses a first region which is less than half the first area; and the second folding section may encompass a second area; wherein the second folding section includes a second magnetic attraction device, wherein the second magnetic attraction device encompasses a second region which is less than half the second area; wherein the second central section encompasses a third area; wherein the second central section includes a third magnetic attraction device, wherein the third magnetic attraction device encompasses a third region which is less than half the third area; and wherein the apparatus is configured so that in the first assembled state, the first magnetic attraction device, the second magnetic attraction device, and the third magnetic attraction device substantially align with each other and are attracted to each other magnetically, and attach to each other magnetically, to attach the first folding section, the second folding section, and the second central section to each other, to keep the apparatus in the first assembled state.

The first central section may have a top surface which is comprised of an attachment device which is configured to attach to the mobile electronic device for temporarily holding the mobile electronics device to the first central section when the apparatus is in the first assembled state.

The first central section may have a top surface which is comprised of an attachment device which is configured to attach to the mobile electronic device for temporarily holding the mobile electronics device to the first central section when the apparatus is in the first assembled state; and wherein the first central section may have a bottom surface, opposite the top surface, wherein the bottom surface is comprised of an attachment device which is configured to attach to the mobile electronic device for temporarily holding the mobile electronics device to the first central section when the apparatus is in the closed state.

In at least one embodiment, an apparatus is provided comprising a first central section, a second central section, a left side wall, and a right side wall; and wherein the first central section, the second central section, the left side wall, and the right side wall are attached together in a first assembled state so that the first central section is adjacent to and at a first angle of about ninety degrees or less and more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section; and wherein the first central section includes a first attachment device; wherein the second central section includes a second attachment device; and wherein the first and second attachment devices are configured to temporarily attach to each other to thereby temporarily attach the first central section and the second central section together in a closed state in which the first central section is substantially aligned and substantially parallel with the second central section, and the left side wall and the right side wall are located in between the first central section and the second central section.

In at least one embodiment, a method is provided including the steps of placing an apparatus in a flat state, such that a left side wall, a first central section, a right side wall, and a second central section of the apparatus, are all substantially in the same plane; placing the apparatus in a first assembled state in which the first central section, the second central section, the left side wall, and the right side wall are attached together so that the first central section is adjacent to and at a first angle of substantially less than ninety degrees and substantially more than zero degrees with respect to the second central section, and at least a portion of the left side wall and at least a portion of the right side wall are adjacent to and approximately perpendicular to the second central section, and so that a mobile electronics device having a screen, can be placed on the first central section, and the screen viewed, with at least the portion of the left side wall, the portion of the right side wall, and the second central section providing shading to the mobile electronics device when it is on the first central section.

The method may also include placing the apparatus in a closed state wherein first and second attachment devices are configured to temporarily attach to each other to thereby temporarily attach the first central section and the second central section together and the first central section is substantially aligned and substantially parallel with the second central section, and the left side wall and the right side wall are located in between the first central section and the second central section.

An apparatus of an embodiment of the present invention may be placed in the closed state, in accordance with a method of an embodiment of the present invention by: (i) folding the left side wall along a first line which is at an angle with respect to the first central section to form a modified left side wall, then folding the modified left side wall along a second line substantially parallel to the first central section to form a second modified left side wall, and then folding the second modified left side wall along a third line substantially parallel to the first central section to cause the first central section to completely overlap the second modified left side wall; (ii) folding the right side wall along a fourth line which is at an angle with respect to the first central section to form a modified right side wall, then folding the modified right side wall along a fifth line substantially parallel to the first central section to form a second modified right side wall, and then folding the second modified right side wall along a sixth line substantially parallel to the first central section to cause the first central section to completely overlap the second modified right side wall; and (iii) folding the second central section over the first central section so that it is substantially aligned with and substantially parallel to the first central section.

An apparatus of an embodiment of the present invention may be further placed in the closed state, in accordance with a method, by attaching a first attachment device of the first central section to a second attachment device of the second central section to thereby attach the first central section to the second central section.

In at least one embodiment, an apparatus is provided comprising a first central section; a second central section; a third central section; a left side wall; and a right side wall. In at least one embodiment the first central section, the second central section, the third central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section.

The third central section may be attached to the first central section; and the third central section may be configured to be folded to provide a stand in the first assembled state, so that the first central section and the mobile electronics device are at an angle with respect to a ground surface, and the mobile electronics device can be viewed, while the second central section, left side wall, and right side wall, provide shade for the mobile electronics device, and a part of the third central section is in contact with the ground surface. In at least one embodiment, the part of the third central section is parallel to the ground surface when the third central section is configured to be folded to provide a stand in the first assembled state.

In at least one embodiment, the first central section includes an opening configured to allow a camera lens of the mobile electronics device to be viewed through the opening of the first central section, when the mobile electronics device is placed on the first central section, and is parallel or substantially parallel to the first central section; and wherein the third central section includes an opening configured to allow the camera lens of the mobile electronics device to be viewed through the opening of the third central section, when the mobile electronics device is placed on the first central section, and is parallel or substantially parallel to the first central section, and the third central section is substantially parallel with the first central section.

The first central section may be at an angle of about seventy-five degrees with respect to the second central section in the first assembled state.

The apparatus may be configured so that the apparatus can alternately be placed in a flat state, in which the first central section, the second central section, the third central section, the left side wall, and the right side wall are located in one plane or placed in the first assembled state.

The third central section may include a first attachment device; the first central section includes a first attachment device; and wherein the first attachment device of the first central section is configured to attach to the first attachment device of the third central section to hold the first central section to the third central section, so that the first central section and the third central section are parallel to each other, and the first central section completely overlaps the third central section. The first central section may include a second attachment device; and wherein the third central section includes an opening which allows the second attachment device of the first central section to be accessed through the opening of the third central section, when the first central section and the third central section are parallel to each other, and the first central section completely overlaps the third central section.

In at least one embodiment, the first central section may have a strap attached to it, such that a person can insert one or more fingers of the person's hand between the first central section and the strap in order to carry the apparatus in the first assembled state, so that the screen of the mobile electronics device can be viewed, while the second central section, the left side wall, and the right side wall provide shading to the screen of the mobile electronics device.

In at least one embodiment, the second central section has first and second parts, and wherein the first part includes a first attachment device and the second part includes a second attachment device; and wherein the first part of the second central section is configured to fold onto the second part of the second central section so that the first attachment device and the second attachment device attach to each other and thereby attach the first part of the second central section to the second part of the second central section, such that the first and second parts are substantially parallel to each other. Each of the first central section, the second central section, the left side wall, and the right side wall may include a pocket on a top surface and a separate pocket on a bottom surface. The first central section may have a retainer which includes an opening; and wherein in the first assembled state, the apparatus is configured so that a wire can be inserted through the opening of the first central section and attached to a port of the mobile electronics device, while the mobile electronics device is on the first central section, and substantially parallel to the first central section.

In at least one embodiment, the left side wall includes an attachment device; the right side wall includes an attachment device; wherein the second central section includes first and second attachment devices; and wherein the first attachment device of the second central section is configured to attach to the attachment device of the left side wall and the second attachment device of the second central section is configured to attach the attachment device of the right side wall to keep the apparatus in the first assembled state.

In at least one embodiment, the attachment device of the left side wall is configured to attach to the attachment device of the right side wall so that at least part of the left side wall is in contact with and parallel to at least part of the right side wall.

In at least one embodiment, the left side wall has an edge adjacent to the first central section which is curved inwards to allow a left thumb of a person to touch the screen of the mobile electronics device in the first assembled state; and wherein the right side wall has an edge adjacent to the first central section which is curved inwards to simultaneously allow a right thumb of a person to touch the screen of the mobile electronics device in the first assembled state.

In at least one embodiment, the first central section includes first and second corners; wherein first and second retainers are attached to the first central section at the first and second corners of the first central section, respectively; and wherein the mobile electronics device includes first and second corners which are configured to be inserted between the first and second retainers, respectively, and the first central section to hold the mobile electronics device to the first central section.

The first central section may include third and fourth corners; wherein third and fourth retainers are attached to the first central section at the third and fourth corners of the first central section, respectively; and wherein the mobile electronics device includes third and fourth corners which are configured to be inserted between the third and fourth retainers, respectively, and the first central section to hold the mobile electronics device to the first central section.

Methods of using an apparatus of one or more embodiments are also provided which include placing a mobile electronics device having a screen on a first central section of the apparatus when the apparatus is in a first assembled state, so that the screen can be viewed, with a left side wall, a right side wall, and a second central section providing shading to the mobile electronics device when the mobile electronics device is on the first central section. The method may include folding a third central section, which is attached to the first central section, to provide a stand in the first assembled state, so that the first central section and the mobile electronics device are at an angle with respect to a ground surface, and the mobile electronics device can be viewed, while the second central section, left side wall, and right side wall, provide shade for the mobile electronics device, and a part of the third central section is in contact with the ground surface.

The method may further include inserting one or more fingers of a person's hand between the first central section and a strap, attached to the first central section, in order to carry the apparatus in the first assembled state, so that the screen of the mobile electronics device can be viewed, while the second central section, the left side wall, and the right side wall provide shading to the screen of the mobile electronics device.

BRIEF DESCRIPTION OF THE DRAWINGS

FIG. 7A shows the apparatus of FIG. 1A in the fifth state, and a mobile electronics device, such as a smart phone;

FIG. 7B shows the mobile electronics device of FIG. 7A inserted into an inner chamber of the apparatus of FIG. 1A in the fifth state;

FIG. 8 shows a top view of the apparatus of FIG. 1 in a sixth state;

FIG. 16F shows another bottom, right, and front perspective view of the apparatus of FIG. 16A in the assembled state of FIG. 16C, and with the portion or section 570 in the first stand position of FIG. 16E, and with a flat surface shown in dashed lines, on which part of the section 570 sits;

DETAILED DESCRIPTION OF THE DRAWINGS

Figure 1A:
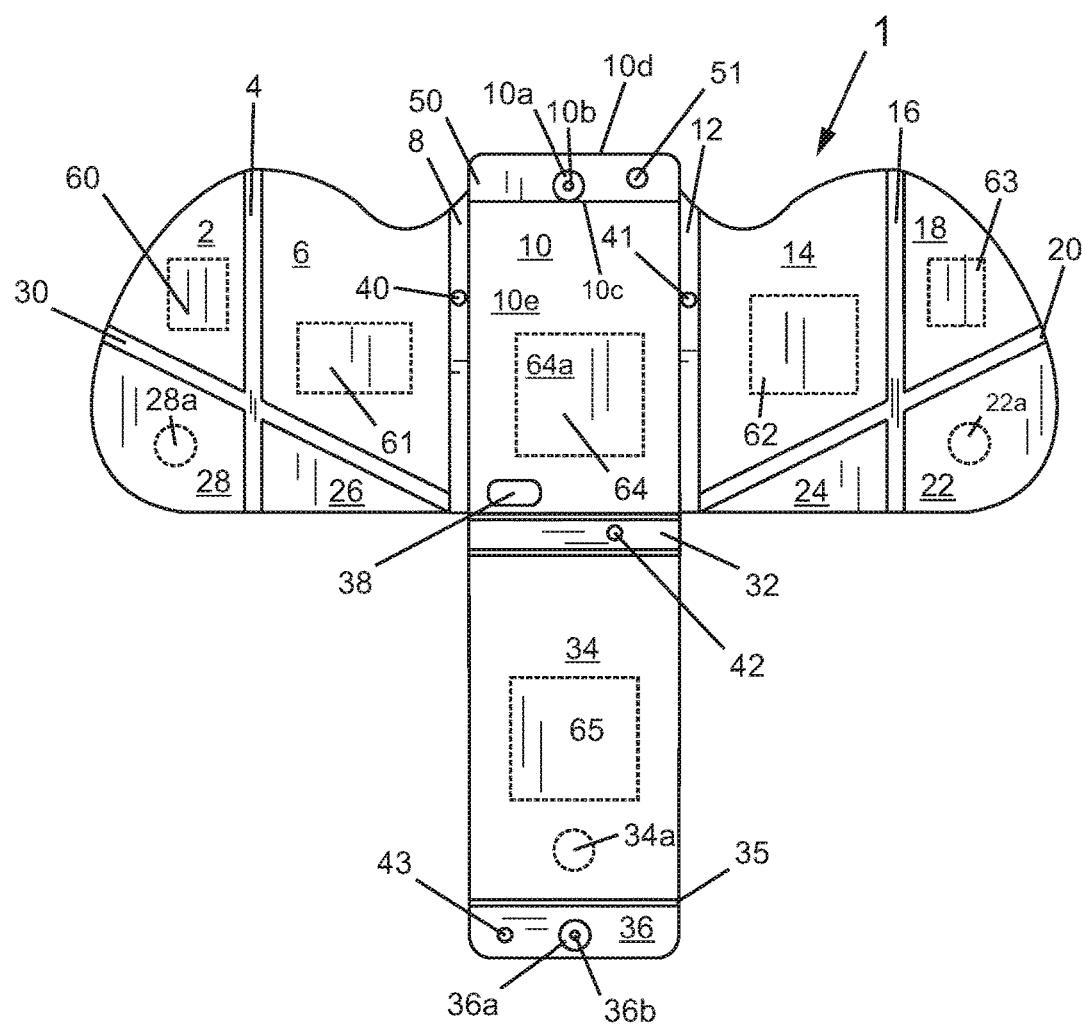
FIG. 1A shows a top view of an apparatus in accordance with an embodiment of the present invention, with the apparatus shown in a first state in which the apparatus is flattened.
Figure 1B:
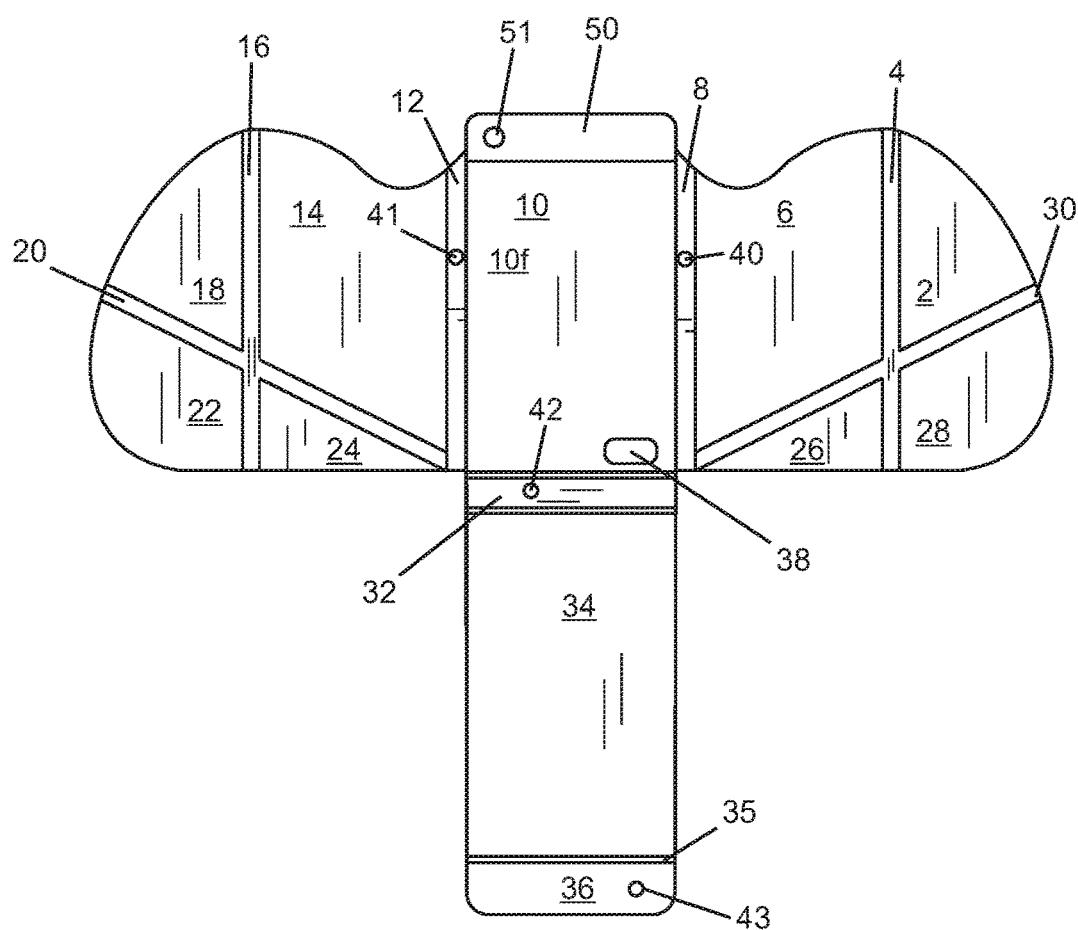
FIG. 1B shows a bottom view of the apparatus of FIG. 1A, in the first state.

FIG. 1A shows a top view of an apparatus 1 in accordance with an embodiment of the present invention, with the apparatus 1 shown in a first state in which the apparatus 1 is flattened. FIG. 1B shows a bottom view of the apparatus 1 of FIG. 1A, in the first state.

The apparatus 1 may include sections 2, 4, 6, 8, 10, 12, 14, 16, 18, 20, 22, 24, 26, 28, 30, 32, 34, 35, and 36. Each of sections 2, 6, 10, 14, 18, 22, 24, 26, 28, 34, and 36 may have three layers, which may include a covering top layer viewed form the top in FIG. 1A, a covering bottom layer, viewed from the bottom in FIG. 1B, and a stiff inner layer sandwiched between the top layer and the bottom layer. The stiff inner layer may be a flat sheet material, such as a stiff, rigid cardboard, a stiff rigid plastic material, or other stiff rigid materials. Each of sections 4, 8, 12, 16, 20, 30, 32, and 35 may have only two layers, such as a top layer and a bottom layer, similar to sections 2, 6, 10, 14, 18, 22, 24, 26, 28, 34, and 36, but may not include a rigid inner layer. The use of three layers, with an inner rigid layer, and two layers, without an inner rigid layer, is done to allow the apparatus 1 to fold easily in an appropriate manner. The top and bottom layers of sections 2, 4, 6, 8, 10, 12, 14, 16, 18, 20, 22, 24, 26, 28, 30, 32, 34, 35, and 36 may be made of a flexible material which is more flexible, and preferably substantially more flexible and bendable, than the inner rigid material for sections 2, 6, 10, 14, 18, 22, 24, 26, 28, 34, and 36. Generally, it is preferred that sections 2, 6, 10, 14, 18, 22, 24, 26, 28, 34, and 36 be more rigid than the sections 4, 8, 12, 16, 20, 30, 32, and 35, in terms of overall function (i.e. if there are three layers for section 2, the combination of three layers is more rigid than the combination of two layers for section 4, however, section 2 in at least one embodiment, could be only one rigid section, while section 4 could be only one less rigid section).

In other embodiments, sections 2, 4, 6, 8, 10, 12, 14, 16, 18, 20, 22, 24, 26, 28, 30, 32, 34, 35, and 36 may all have the same rigidity and/or be made of the same material, such as a single material, however, by creasing and/or bending sections 4, 8, 12, 16, 20, 30, 32, and 35 very sharply these sections may become flexible, or at least more flexible than prior to creasing and may then be used to provide the function for forming apparatus 1 into the state shown in FIGS. 6A-B and FIGS. 7A-7B.

In addition the inner rigid layer of section 10 is preferably, in at least one embodiment, made of more rigid material than the inner rigid layers of sections 2, 6, 14, 18, 22, 24, 26, 28, 34, and 36. Providing a more rigid material for section 10 provides support for a smart phone 100 as shown in FIG. 7B.

The other sections 2, 6, 14, 18, 22, 24, 26, 28, 34, and 36 do not need to be as rigid as section 10, in at least one embodiment, and providing a less rigid material for those other sections, saves on costs for the apparatus 1.

When section 10 is very rigid, it helps with support for the device or smartphone 100 being placed on it, but this also can add more stress to sections 8 and 12, and possibly 32, because when sections 8, 12, and 32 are less rigid and are then folded onto section 10 which is more rigid, it can create some resistance since it is butting up against something stiffer and this could cause the material to wear out faster over time. Therefore, in some embodiments, section 10 may have the same rigidity and/or be may of the same material as sections 2, 6, 28, 26, 14, 18, 24, 22, 34, and 36.

The section 10, in at least one embodiment, includes an opening or openings 38 located anywhere on section 10, which may be aligned with a camera lens for the device of smartphone 100.

The sections 10 and 34 may be part of or may be called first and second central sections due to their central location in FIG. 1A. The combination of sections 2 and 6, and the part of section 4 connecting sections 2 and 6 may be part of or may be called a left side wall, because in a first assembled state of FIG. 6A, it forms a left side wall. The combination of sections 14 and 18, and the part of section 16 connecting sections 14 and 18 may be part of or may be called a right side wall, because in a first assembled state of FIG. 6A, it forms a right side wall.

Figure 2A:
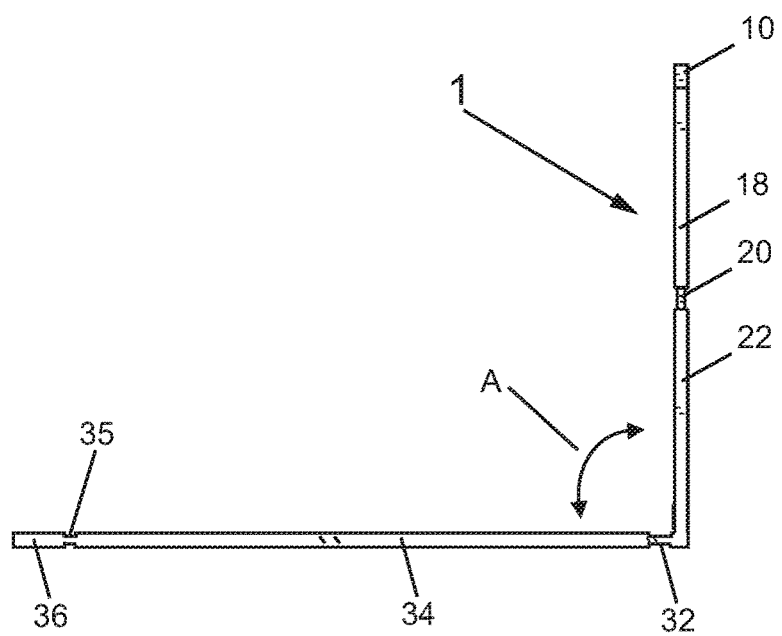
FIG. 2A shows a right side view of the apparatus of FIG. 1A in a second state, in which a first part of the apparatus is bent to a ninety degree angle with respect to a second part of the apparatus.
Figure 2B:
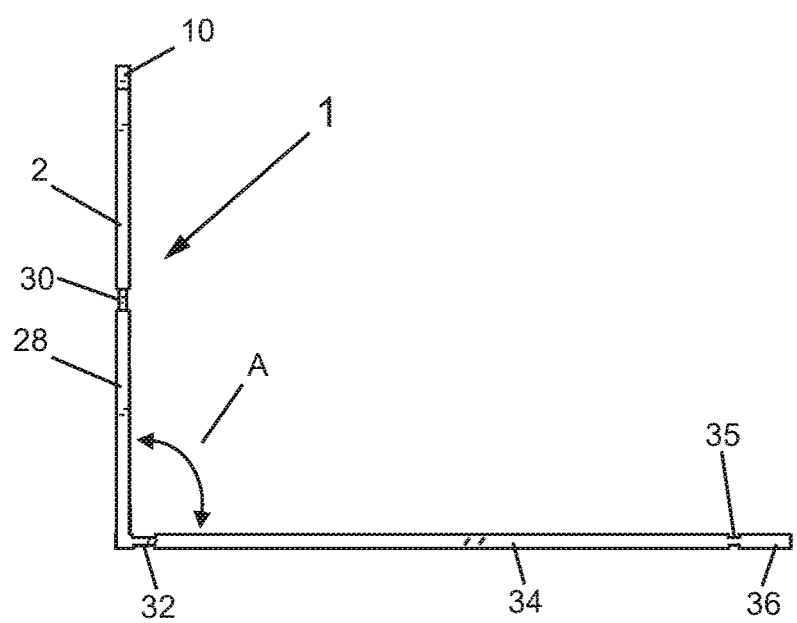
FIG. 2B shows a left side view of the apparatus of FIG. 1A in the second state.
Figure 3A:
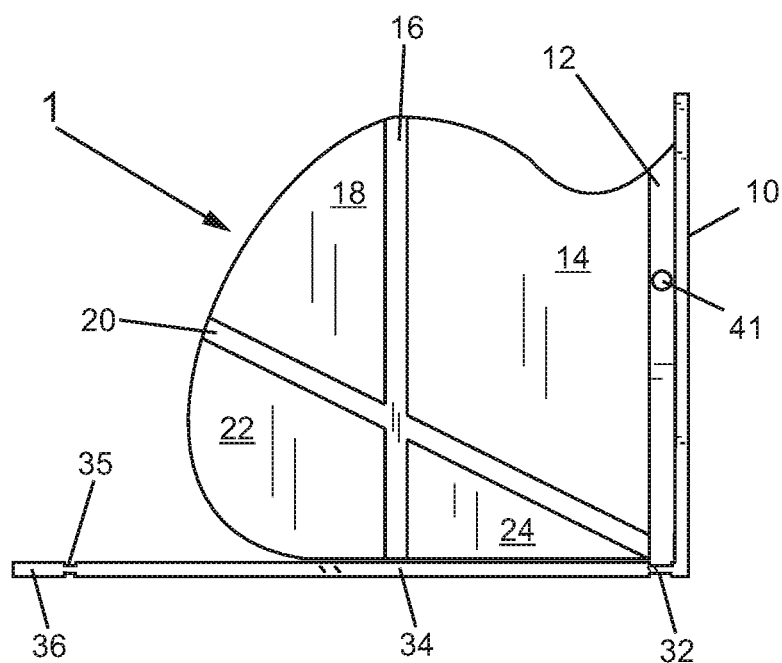
FIG. 3A shows a right side view of the apparatus of FIG. 1A in a third state, in which a third part and a fourth part of the apparatus are bent to a ninety degree angle with respect to the rest of the apparatus.
Figure 3B:
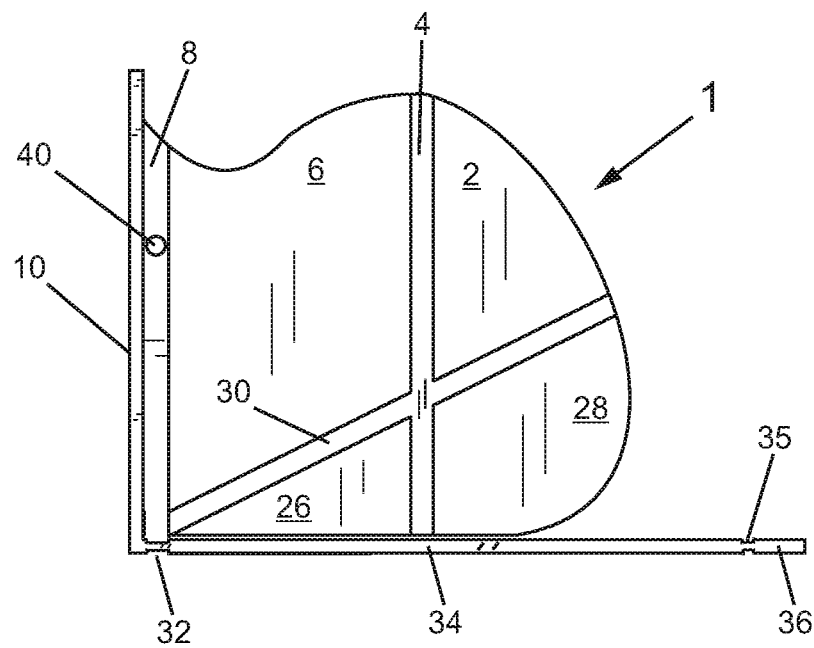
FIG. 3B shows a left side view of the apparatus of FIG. 1A in the third state.

FIG. 2A shows a right side view of the apparatus 1 of FIG. 1A in a second state, in which a first part (including sections 2, 10, 18, 20, 22, 28, and 30) of the apparatus 1 is bent to a ninety degree angle A with respect to a second part (including sections 32, 34, 35, and 36) of the apparatus 1. FIG. 2B shows a left side view of the apparatus 1 of FIG. 1A in the second state;

FIG. 3A shows a right side view of the apparatus 1 of FIG. 1A in a third state, in which a third part (including sections 12, 14, 16, 18, 20, 22, 24) and a fourth part (including sections 2, 4, 6, 8, 26, 28, and 30) of the apparatus 1 are bent so that the third part and the fourth part are both perpendicular to sections 10 and 34. FIG. 3B shows a left side view of the apparatus 1 of FIG. 1A in the third state.

Figure 4A:
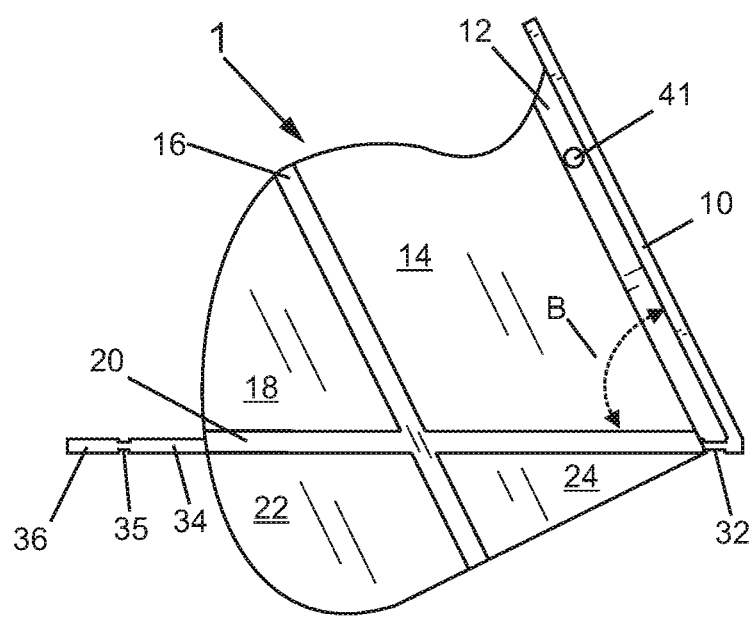
FIG. 4A shows a right side view of the apparatus of FIG. 1A in a fourth state, in which a fifth part of the apparatus is bent to a sixty degree angle with respect to a sixth part of the apparatus.
Figure 4B:
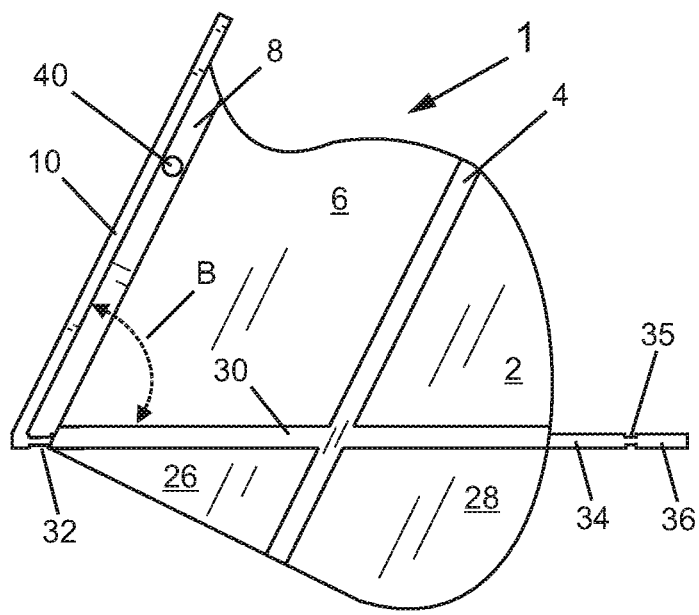
FIG. 4B shows a left side view of the apparatus of FIG. 1A in the fourth state.

FIG. 4A shows a right side view of the apparatus 1 of FIG. 1A in a fourth state, in which a fifth part (including section 10) of the apparatus 1 is bent to a seventy degree angle B with respect to a sixth part (including section 34, 35, and 36) of the apparatus 1. FIG. 4B shows a left side view of the apparatus 1 of FIG. 1A in the fourth state. The sections 20 and 30 are configured so that the in the fourth state they are both parallel or substantially parallel to the sections 34, 35, and 36.

Figure 5A:
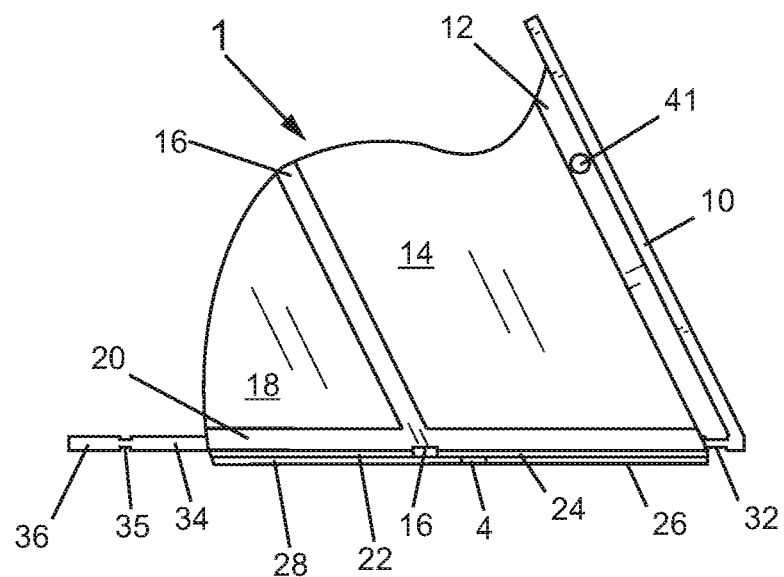
FIG. 5A shows a right side view of the apparatus of FIG. 1A in a fifth state, in which a seventh part and an eighth part of the apparatus are bent so that they overlap the sixth part of the apparatus.
Figure 5B:
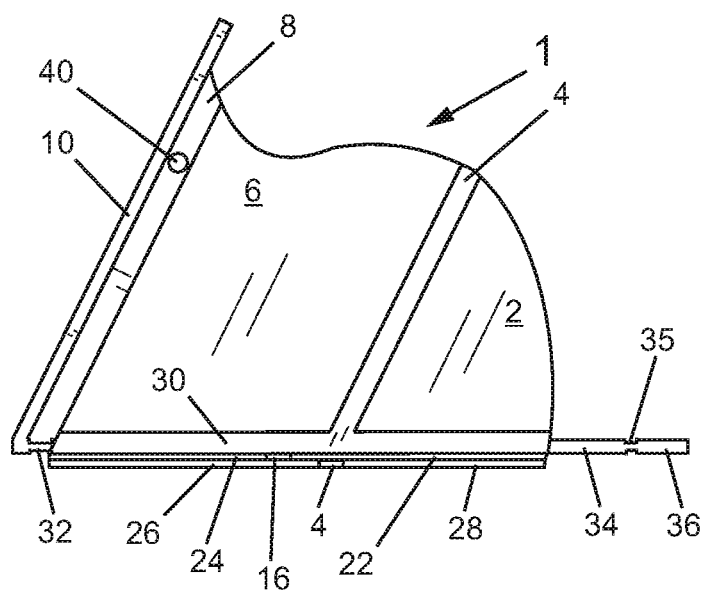
FIG. 5B shows a left side view of the apparatus of FIG. 1A in the fifth state.

FIG. 5A shows a right side view of the apparatus 1 of FIG. 1A in a fifth state, in which a seventh part (including sections 22 and 24) and an eighth part (including sections 26 and 28) of the apparatus 1 are bent so that they overlap or underlap the sixth part (including sections 34, 35, and 36) of the apparatus 1. FIG. 5B shows a left side view of the apparatus 1 of FIG. 1A in the fifth state.

Figure 6A:
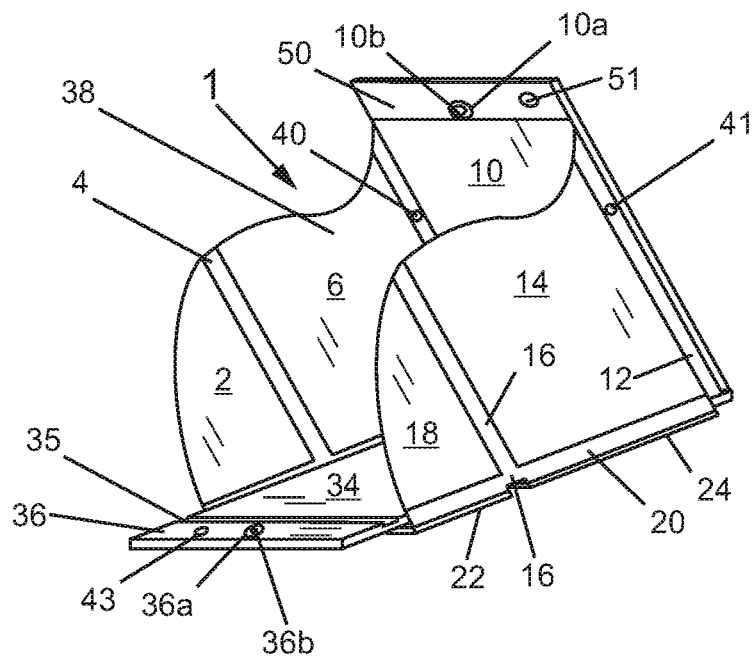
FIG. 6A shows a right, top, and front perspective view of the apparatus of FIG. 1A in the fifth state.
Figure 6B:
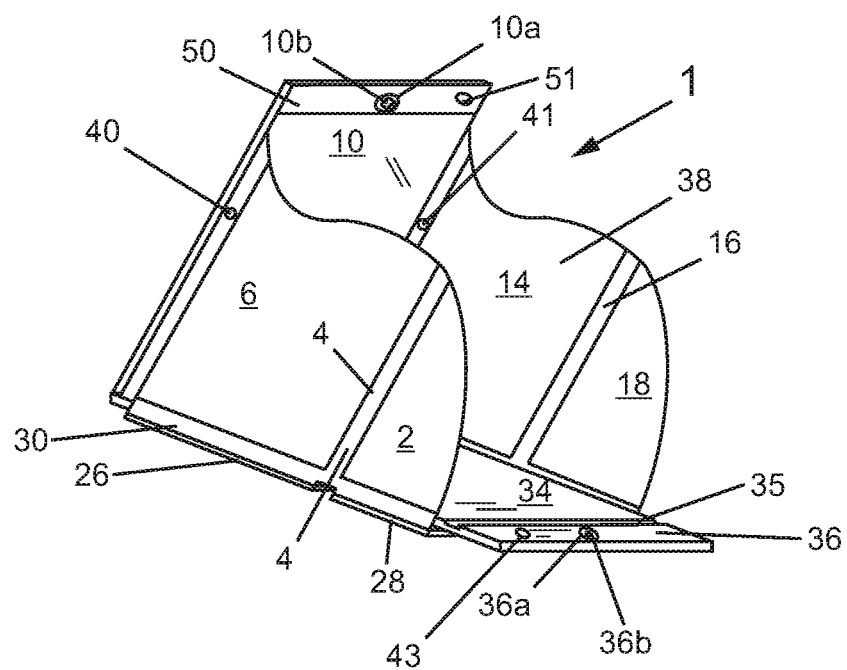
FIG. 6B shows a left, top, and front perspective view of the apparatus of FIG. 1A, in the fifth state.

FIG. 6A shows a right, top, and front perspective view of the apparatus 1 of FIG. 1A in the fifth state. FIG. 6B shows a left, top, and front perspective view of the apparatus 1 of FIG. 1A, in the fifth state.

FIG. 7A shows the apparatus 1 of FIG. 1A in the fifth state, and a mobile electronics device 100, such as a smartphone. FIG. 7B shows the mobile electronics device 100 of FIG. 7A inserted into an inner chamber 38 of the apparatus 1 of FIG. 1A in the fifth state. The mobile electronics device 100 is inserted so that the screen 102 is facing outwards as shown in FIG. 7B, and can be seen by an individual. Effectively a first wall, which may include sections 34, 35, and 36, a second wall which may include sections 14, 16, and 18, and a third wall, which may include sections 6, 4, and 2, are provided which shield the screen 102 of the mobile electronics device 100 from glare of the sun. The first wall (34, 35, and 36), in at least one embodiment, is at an angle with respect to the section 10, which may be an angle B shown in FIGS. 4A and 4B which may be about seventy degrees. The angle B may be in a range from 50 to 90 degrees, and the angle B may be adjustable. For example, less of sections 22, 24, 26, and 28 may be folded under or on top of section 34 and attached to section 34 to provide a higher angle, approaching ninety degrees. Alternatively, part of sections 2, 6, and 18, and 14 can be folded under or on top of section 34 to provide a lower angle, less than seventy degrees. While for the about seventy degree example the sections 20 and 30 are parallel or substantially parallel to section 34, for examples greater than about seventy degrees, or less than about seventy degrees, the sections 20 and 30 would be at an angle with respect to section 34. For examples greater than about seventy degrees, the sections 22, 24, and 26, and 28 would have to be bent or creased, and for examples less than about seventy degrees the sections 18, 14, 6, and 2 would have to be bent or creased. Alternately, additional flexible sections, similar to, or identical to sections 20 and 30, may be provided at different angles in different embodiments. For example, sections 20 and 30 are at an angle of seventy degrees or about seventy degrees (angle B) with respect to section 10. Flexible straight sections may be provided at an angle of sixty degrees and eighty degrees with respect to section 10, to easily configure the apparatus 1, into sixty, seventy, or eighty degree angles. In at least one embodiment, the sections 20 and 30 may be at an angle of between fifty and ninety degrees, inclusive, with respect to the section 10. The apparatus 1 can have multiple straight flexible sections, instead of one section 20, and multiple straight flexible sections, instead of one section 30, to allow the user to manually adjust to the angle of their choice.

The angle of about seventy degrees, for some purposes has been determined to be sufficient for someone to see the screen 102 comfortably, and to also block glare from the sun or other lights or other distractions or impediments to viewing screen 102. In at least one embodiment, the angle of about seventy degrees, for angle B in FIGS. 4A-4B has been determined to be critical for someone to see the screen 102 comfortably and to also block glare. However, generally, in accordance with embodiments of the present invention, the angle B may be substantially less than 90 degrees, and substantially more than zero degrees, such as for example between eighty and sixty degrees. The angle B needs to be substantially more than zero degrees or the entirety of the screen 102 cannot be seen, cannot be seen comfortably, or cannot be seen at all by a user. The angle B needs to be substantially less than ninety degrees, in one or more embodiments, or shading is not provided for overhead sun.

The second wall (14, 16, and 18) and the third wall (6, 4, and 2) are preferably parallel to each other, and perpendicular or substantially perpendicular to the section 10.

The sections 14 and 6 have curved in areas 14a and 6a, respectively, near device 100, to allow someone to insert thumbs, or fingers generally, for texting or otherwise using the device 100 or screen 102.

The sections 26, 28, 22, and 24 may also include Velcro (trademarked) or hooks or loops sections, magnetics or another attachment device on the top surface or bottom surface shown in FIG. 1A. If magnets are used they may be on the top surface of sections 26, 28, 22, and 24, they may be on the bottom surface, or they may be embedded within the material for those sections. The section 34 may have Velcro (trademarked) or hooks or loops sections, or another attachment device on the top surface or bottom surface, or if magnets are used they may be embedded within the material for section 34, shown in FIG. 1B, which mates, connects and/or attaches to the attachment devices of sections 26, 28, 22, and 24 in the state of FIGS. 5A and 5B to at least temporarily keep the apparatus 1 in the state of FIGS. 5A, 5B, 6A, 6B, 7A, and 7B.

The section 10 may also include Velcro (trademarked) or hooks or loops sections or another attachment device on the top surface 10e or on the pocket top surface 64a of optional pocket 64 shown in FIG. 1A for attaching to the device 100, and the sections 10 may include Velcro (trademark) or hooks or loops section on its bottom surface 10f shown in FIG. 1B, or on an optional pocket top surface if the pocket is on attached to or makes up a part of the bottom surface 10f, so that when the apparatus 1 is in a "closed" state, the mobile electronics device or smartphone 100 and/or cover of the device 100 can be temporarily attached to the bottom surface 10f of section 10. The device 100 may also include Velcro (trademarked) or hooks or loops sections or another attachment device on its bottom surface (opposite its screen 102) or device 100 may include a covering which includes such an attachment device. The bottom surface of device 100 may thus be at least temporarily attached to the top surface 10e of section 10, and a camera lens of device 100 aligned with opening 38 to allow pictures to be taken by device 100 through opening 38 of section 10 of the apparatus 1. In at least one embodiment section 10 may have one or more of openings similar to or identical to opening 38.

In at least one embodiment, the interior of the apparatus 1, in the state shown in FIGS. 6A-6B and 7A-B, such as including surfaces of sections 10, 6, 4, 2, 18, 16, 14, 34, 35, and 36, which face towards inner chamber 38, has a dark color, such as black in order to reduce glare or reflection from the sun or other light sources. In other embodiments, if the apparatus 1 is used for privacy but not necessarily to reduce glare, then lighter colors may be used for the interior which faces inner chamber 38.

In at least one embodiment, the apparatus 1, can be placed in a "closed" state, in the following step by step manner. When the apparatus 1 is in the first state as shown in FIG. 1A, the sections 22 and 24 can be folded along the straight line formed by section 20 and onto sections 14 and 18; and in a similar manner, sections 26 and 28 can be folded along the straight line formed by section 30 and onto sections 2 and 6 to put the apparatus 1 in a sixth state, in which the apparatus 1 is folded and flattened as shown in FIG. 8.

Figure 9:
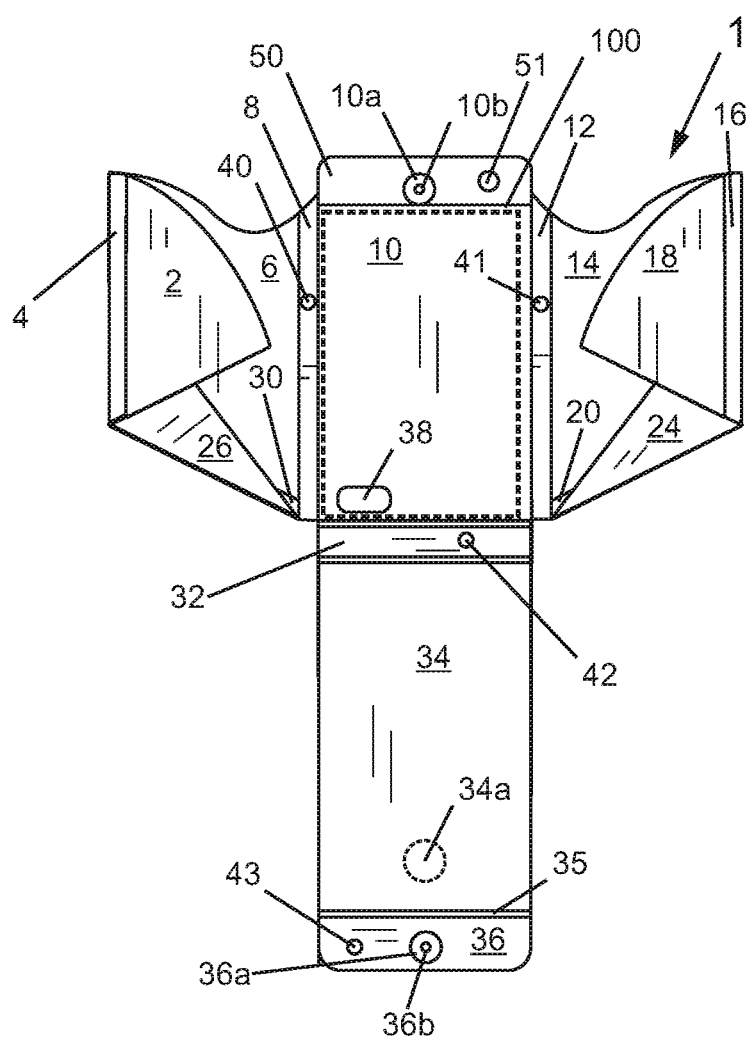
FIG. 9 shows a top view of the apparatus of FIG. 1 in a seventh state.

Next, the section 18 can be folded along the straight vertical line formed by part of section 16, and onto section 14; and the section 2 can be folded along the straight vertical line formed by part of section 4 and onto section 6 to put the apparatus 1 in a seventh state, in which the apparatus 1 is folded and flattened as shown in FIG. 9.

Figure 10:
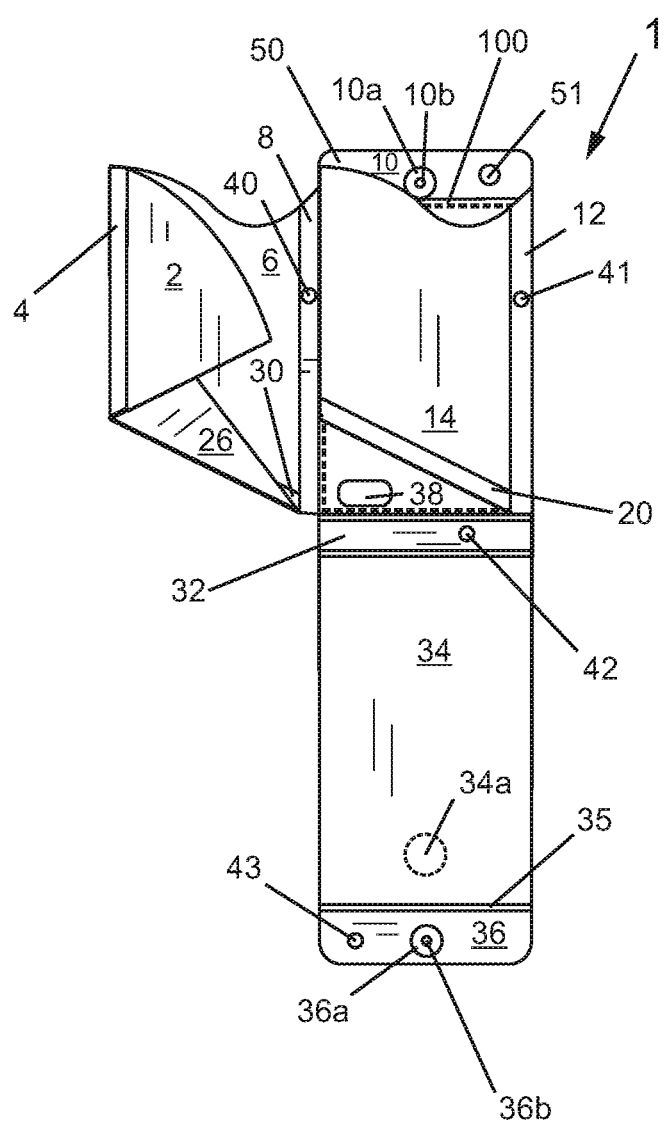
FIG. 10 shows a top view of the apparatus of FIG. 1 in an eighth state.
Figure 11:
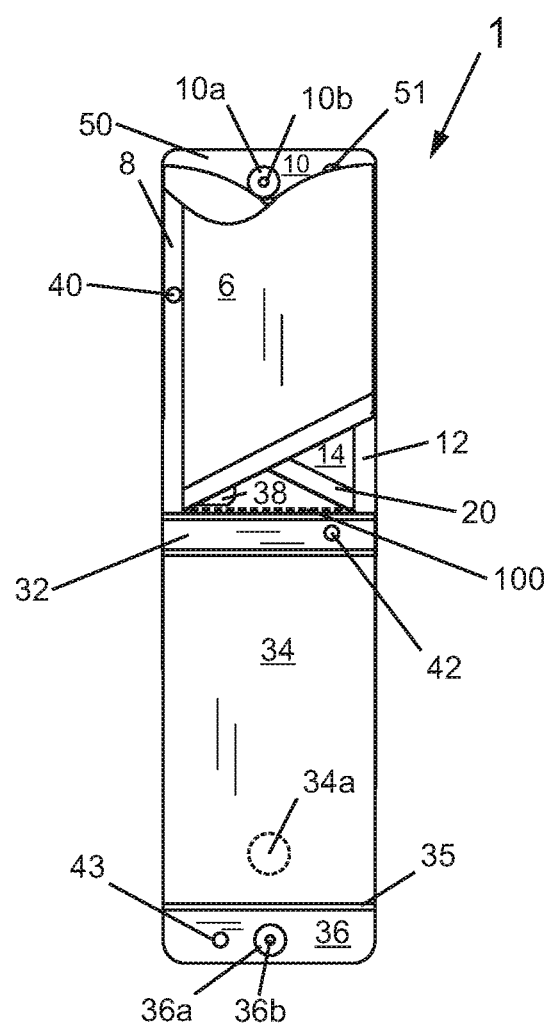
FIG. 11 shows a top view of the apparatus of FIG. 1 in a ninth state.

Next, the combination of sections 14, 16, 18, 22, 24, and 20 can be folded along the straight line formed by section 12 and onto section 10 to put the apparatus 1 in an eighth state as as shown in FIG. 10. Then the combination of sections 6, 4, 2, 30, 26, and 28 can be folded along the straight line formed by section 8 and onto section 10 and on top of the combination of sections 14, 16, 18, 22, 24, and 20 to put the apparatus 1 in a ninth state, in which the apparatus 1 is folded and flattened as shown in FIG. 11.

Figure 12:
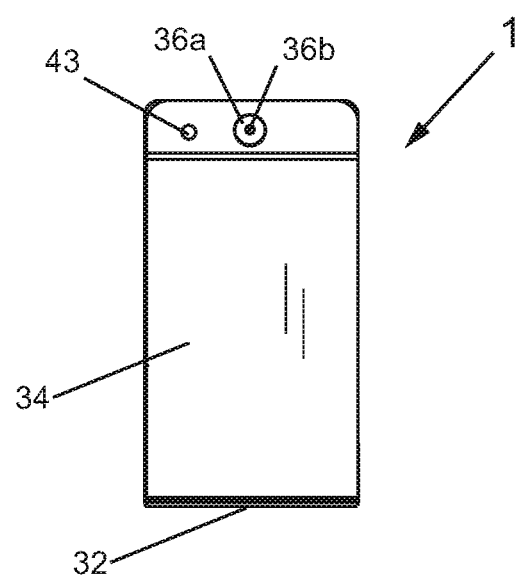
FIG. 12 shows a top view of the apparatus of FIG. 1 in a tenth or closed state.

Thereafter the section 34 can be folded along the straight line formed by section 32 and onto section 10 and onto all of the combination of sections 6, 4, 2, 30, 26, and 28 and sections 14, 16, 18, 22, 24, and 20. In at least one embodiment a protrusion or other attachment device 10b of device 10a of section 10 can be snapped into or otherwise attached to indentation or other attachment device 36b of device 36a of section 36, to temporarily hold the apparatus 1 in a tenth state or closed state as shown in FIG. 12. The attachments devices 10a, 10b, and 36a and 36b may be Velcro (trademarked) mating hooks and loops or some other attachment devices for temporarily attaching section 36 to section 10. There may be multiple attachment devices located on section 10 and multiple attachment devices located on section 36.

In at least one embodiment, a band, strap or some other means may be used on sections 10 and 34 to keep the apparatus remaining in a "closed" state, whether or not, a protrusion or other attachment device 10b of device 10a of section 10 is used or otherwise attached to indentation or other attachment device 36b of device 36a of section 36. A band or strap 200 is shown by dashed lines in FIG. 13A separate from the apparatus 1, and in FIG. 13B circling or surrounding a portion of section 10, and a portion of section 36 to help hold the sections 34 and 10 together in the closed state of FIGS. 13A-B. This keeps the apparatus 1 remaining in the "closed" state, whether or not sections 10 and 36 have components 10b, 10a, 36b and 36a. The band or strap 200 may be a rubber band, for example. In at least one embodiment the band or strap 200 may be attached to apparatus 1, such as attached to a portion of section 10 or a portion of section 36.

In at least one embodiment the apparatus 1 can be folded into an alternate "closed" state, from the apparatus 1 being in the state of FIG. 5A, 5B, 6A, 6B, 7A or 7B, to the first central section or section 10 being substantially aligned and substantially parallel to the second central section of section 34, without detaching the sections 22, 24, 26, and 28 from the section 34, by various folding methods.

In at least one embodiment of the present application, the apparatus 1 of the present application remains in the first assembled or upright state shown in FIGS. 5A-5B, 6A-6B, and 7A-7B, without any external pressure, at least in part, because of the orientation of the sections 4, 8, 12, and 16, and the relative rigidity of sections 6 and 14. Simply put, the apparatus 1 of the present application, cannot collapse from the state shown in FIGS. 6A-6B, without bending sections 6 and 14, and those sections are typically rigid. If one attempts to fold the apparatus 1 from the first assembled state in FIGS. 6A-6B, along lines 4 and 16, one cannot do so, at least not substantially, because of the manner of attachment of sections 22, 24, 26, and 28 to section 34. If one attempts to fold the apparatus 1 from the first assembled state in FIGS. 6A-6B, along lines 8 and 12, one also cannot do so, at least not substantially, because of the manner of attachment of sections 22, 24, 26, and 28 to section 34.

In contrast, in at least one embodiment of U.S. Pat. No. 9,351,415 (hereinafter "Zaccaria '415) issued on May 24, 2016, to inventor Nathan J. Zaccaria, the assembled apparatus 1 shown in FIG. 4 of Zaccaria '415 may have a tendency to collapse along fold lines 2a and 10a shown in FIG. 1A of Zaccaria '415, as shown in FIG. 9 of Zaccaria '415, when there is no support or external pressure on sections 2, 24, 12, and 10 of Zaccaria '415.

However, in some embodiments of the present application, further fold lines may be included in sections 6 and 14, for example, similar to fold lines 2a and 10a shown in Zaccaria '415, which is incorporated by reference herein. Although not preferred, such further fold lines, may allow the apparatus 1 of the present application to collapse into a different closed state.

Figure 13A:
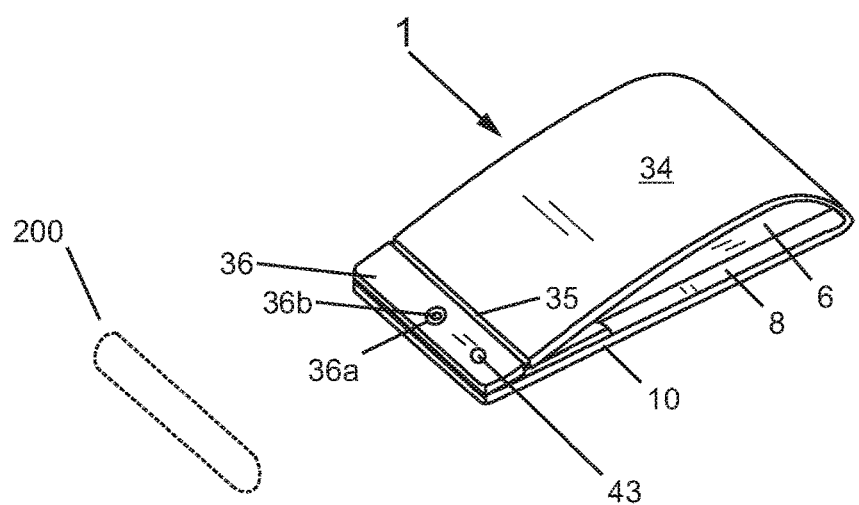
FIG. 13A shows a front, top, and right side perspective view of the apparatus of FIG. 1 in the tenth or closed state, and with a band next to the apparatus of FIG. 1.
Figure 13B:
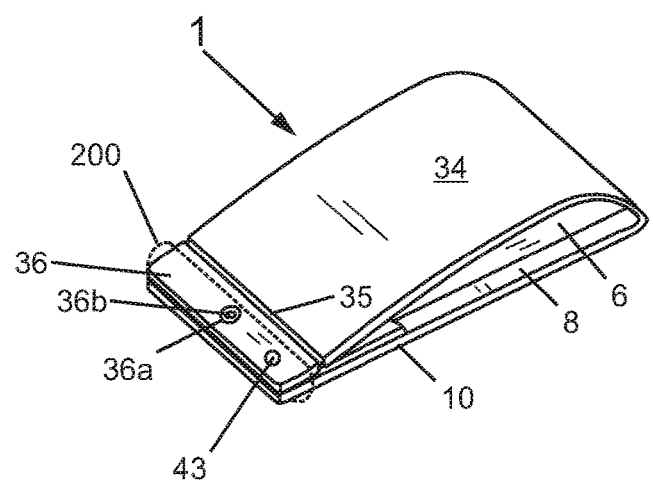
FIG. 13B shows a front, top, and right side perspective view of the apparatus of FIG. 1 in the tenth or closed state, and with the band of FIG. 13A, placed around a portion of the apparatus of FIG. 1.

In at least one embodiment of the present application, sections 8, 12, 32, and 36 may be widened to allow formation of a sufficient cavity when the apparatus 1 is in the closed state of FIGS. 13A-B, so that the apparatus 1 can hold the combination of folded sections 6, 4, 2, 30, 26, 28, 14, 16, 18, 22, 24, and 20 and allow a device 100 that has a cover or no cover, to remain in the same position and orientation with respect to section 10. For example, device 100 can be located on and aligned with section 10, in the area shown by dashed lines in FIG. 8. At this point, the device 100 can be thought of as being a part of section 10, and the sections 14, 16, 18, 20, 22, and 24 can be folded onto the combination of sections 10 and device 100, as previously described with reference to section 10, and then the sections 2, 4, 6, 26, 28, and 30 can be folded onto the combination of sections 10, device 100, and sections 14, 16, 18, 20, 22, and 24, as previously described with reference to FIGS. 8-11. In FIGS. 8-9, an entire surface such as a top surface of the device or smartphone 100 (having the screen 102) can be seen, as shown by dashed lines. In FIG. 10, the top surface of the device 100 is now partially, and substantially covered and protected by the sections 14, 16, 18, 20, 22, and 24, which are folded on top of the device 100, and on top of the screen 102. In FIG. 11, the top surface of the device 100 is more fully covered then in FIG. 10. In FIG. 12, the top surface of the device 100 is now fully covered by section 34. The device 10, in FIG. 12, is now protected and secured within a pocket of the apparatus 1.

When widening sections 8, 12, and 36 to form a cavity or pocket for device 100 section 36 may or may not need to be widened. Generally it is preferred that section 36 be widened to form a cavity, but in at least one embodiment it may not need to be and the apparatus 1 can still be placed into a "closed" state.

Although the attachment device 28a is shown attached at a location in section 28 FIG. 1A, the attachment device 28a can be attached to anywhere at a location in either or both of section 28 or 26, depending on the location of attachment device 34a. Similarly, although the attachment device 22a is shown attached at a location in section 22, the attachment device 22a can be attached to anywhere at a location in either or both of section 24 or 22, depending on the location of attachment device 34a.

In at least one embodiment sections 8, 12, 32, and 36 may have an opening or openings, such as openings 40, 41, 42 and 43, respectively, shown in FIG. 1A. Such openings can be located anywhere within these sections to allow for access to the device 100 being accommodated, for reasons such as, but not limited to charging, earbud/earphone jack, speaker, power control, volume control and microphone.

In at least one embodiment, section 10 may have a retainer section 50 which may be a substantially rectangular portion of section 10 located across the width of section 10, from line 10c to edge 10d in FIG. 1A at or near the outer edge to keep the device 100 from slipping out when on section 10. The section 50 may be somewhat thicker than the rest of section 10, so that the device 100 sits on section 10, but not on section 50, and is prevented by section 50 from sliding off of the rest of section 10. The retainer 50 may have an opening 51 or further openings in FIG. 1A to allow for access to the device 100 being accommodated, for reasons such as, but not limited to charging, earbud/earphone jack, speaker, power control, volume control and microphone.

The retainer 50 may be of different shapes, for example, the retainer 50 may be comprised of two separate corner portions, approximately at the junction of line 10*d*, and section 8 and approximately at the junction of line 10*d* and section 12 to keep device 100 from sliding off of section 10. In such an embodiment, the section 50 may not need to go continuously all the way across the width of section 10 from the border with section 8 to the border of section 12.

In at least one embodiment sections 2, 6, 14, 18, 10, 34 may have optional pockets 60, 61, 62, 63, 64, and 65, respectively, shown by dashed lines in FIG. 1A, but not shown in other drawings. Alternatively, one or more of sections 2, 6, 14, 18, 10, 34 may have a pocket. The pockets 60, 61, 62, 63, 64, and 65 may be attached to, integrated with, and or protrude from the top surface or the bottom surface of the respective sections. Each of the pockets 60, 61, 62, 63, 64, and 65 may be used to hold or store things such, but not limited to a driver's license, credit card, and keys etc.

In at least one embodiment section 10 may have mark, marks, crease or creases such as 10*c*. The line 10*c* may also mark the border of the retainer or section 50. The line 10*c* may be located closer to section 32 than shown in FIG. 1, and may not be the border of section 50. The line 10*c* may be used to indicate where different size devices 100 will be placed on section 10. For example, to help someone know where to place the device 100 so the camera lens of the device 100 will align with the opening 38 in apparatus 1. An individual may align the edge of the device 100 with the line or crease 10*c*.

The device 100 can be a mobile electronic device such as, but not limited to, a smartphone, e-reader, ipad (trademarked) or tablet.

The apparatus 1 can be of different sizes and dimensions depending on the mobile electronic device which is being accommodated.

In at least one embodiment section 10 is longer than section 34, where the length of each of sections 10, and 34 is greater than the width of sections 10 and 34.

Figure 14:
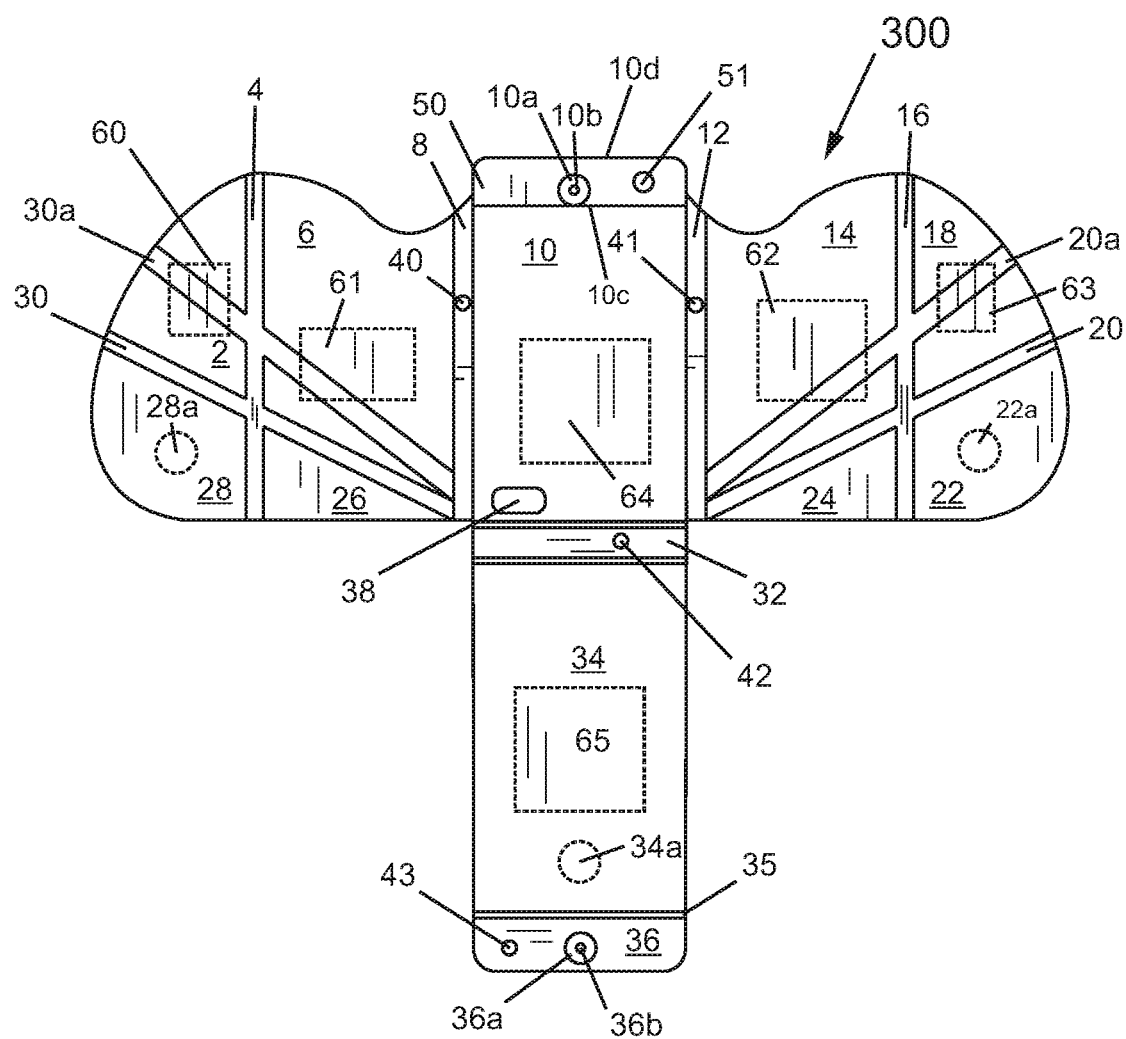
FIG. 14 shows a top view of another apparatus in accordance with another embodiment of the present invention which may be identical to the apparatus of FIG. 1A, except for providing multiple sections on each side to help orient the apparatus at different angles when assembled in a closed state similar or identical to FIGS. 13A-13B.

FIG. 14 shows a top view of another apparatus 300 in accordance with another embodiment of the present invention which may be identical to the apparatus 1 of FIG. 1A, except for providing multiple sections 20 and 20*a* on the left side, and multiple sections 30 and 30*a* on the right side of central section 10, to help orient the apparatus 300 at different angles when in an assembled state similar or identical to FIGS. 6A-6B and 7A-7B. The apparatus 300 may be put in an assembled state by orienting sections 20 and 30 parallel to section 34 as in FIGS. 4A-4B, and folding along sections 20 and 30 as previously explained with reference to FIGS. 3A-B, 4A-4B, 5A-5B, and 6A-6B.

Alternatively, to put the section 10 at a different, and reduced angle with respect to section 34, the apparatus 300 may be put in an assembled state by orienting sections 20*a* and 30*a* parallel to section 34 (similar to what is done from FIGS. 3A-B to FIGS. 4A-4B, but now orienting sections 20*a* and 30*a* parallel to section 34, instead of sections 20 and 30) and folding along sections 20*a* and 30*a* (similar to what is done from FIGS. 4A-4B to FIGS. 5A-5B, but now folding along sections 20*a* and 30*a*). Using sections 20*a* and 30*a*, instead of sections 20 and 30, puts the section 10 at a different and lesser angle with respect to section 34, than with sections 20 and 30, and this may be desired by a user attempting to provide the correct sun or light shading.

The apparatus 1, as shown in FIG. 1A, is typically symmetrical about a center line along a length of sections 10 and 34, which cuts the apparatus 1 in half. The apparatus 1 in its first assembled state of FIG. 6A is substantially symmetrical in the sense that a mobile electronics device 100 can be placed on either section 10 or section 34, and the apparatus 1 would function largely the same, although there may be some significant differences.

Figure 15A:
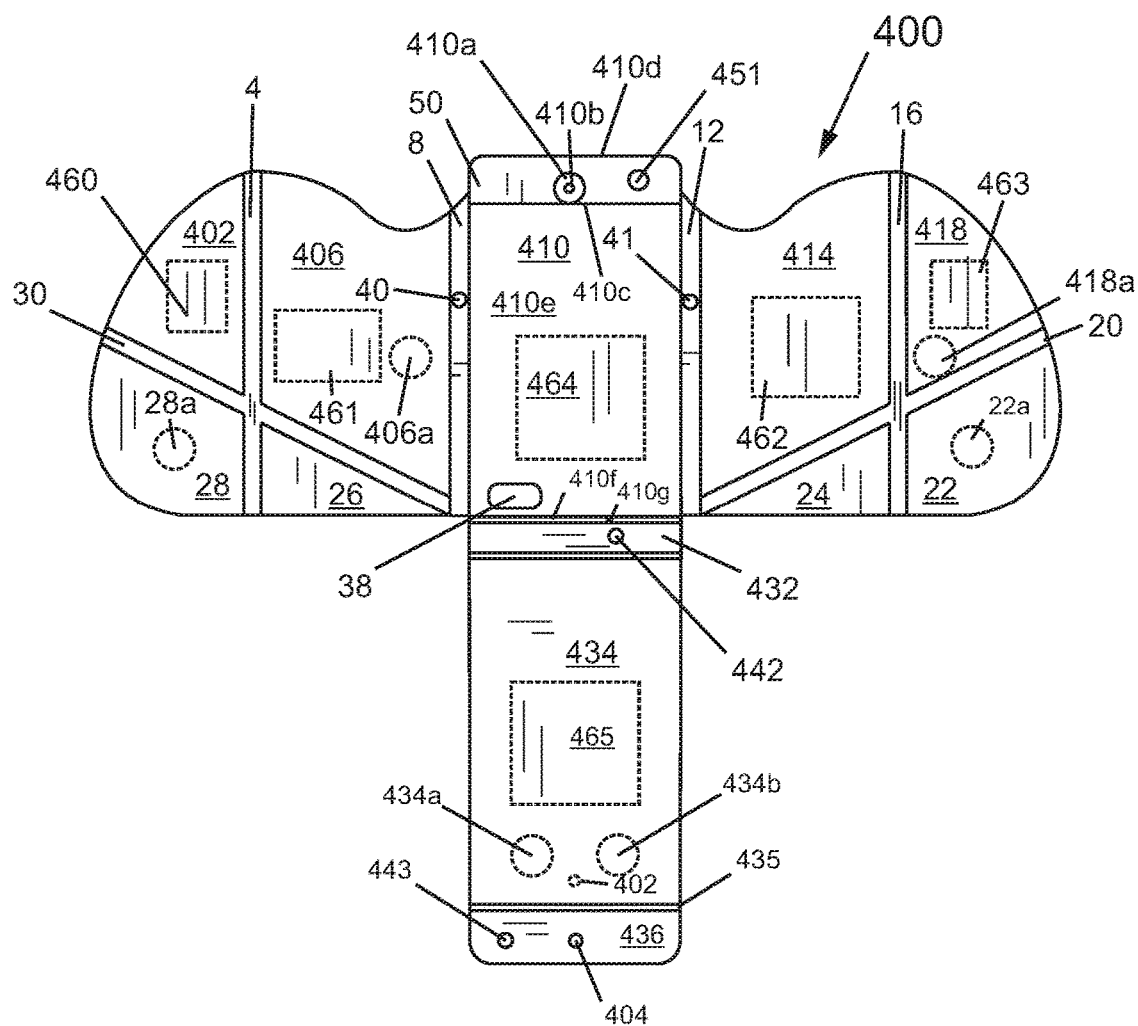
FIG. 15A shows a top view of an apparatus in accordance with another embodiment of the present invention, with the apparatus of FIG. 15A shown in a state in which it is entirely flattened.

FIG. 15A shows a top view of an apparatus 400 in accordance with another embodiment of the present invention, with the apparatus 400 of FIG. 15A shown in a state in which it is entirely flattened. The apparatus 400 may be identical to the apparatus 1 shown in FIG. 1A, except as will be explained.

The apparatus 400 includes opening 442 which may be identical to opening 42 shown in FIG. 1A. The apparatus 400 includes section 432 which may be identical to section 32 shown in FIG. 1A. The apparatus 400 includes a section 434 which may differ somewhat from the section 34 of the apparatus 1 of FIG. 1A. The section 434 includes a material 402, which is not part of apparatus 1 of FIG. 1A, which may be inside of the material of section 434. The material 402 may be an attachment device such as a magnetic, magnetic material, or a Velcro (trademarked) material, such as hooks and loops or some other attachment material or device. The material 402 may be on the outside of section 434 for certain types of material, such as typically Velcro (trademarked) or hooks and loops, or may be on the inside of section 434, such as for magnets or metallic or magnetic material. The apparatus includes a section 436 which may differ somewhat from the section 36 of the apparatus 1 of FIG. 1A. The section 436 has an opening 443 which may be identical to the opening 43 for apparatus 1 of FIG. 1A. However, the section 436, in at least one embodiment, has a magnet or magnetic material 404 which is configured to be magnetically attracted to material 402, when materials 402 and 404 are in close proximity, as in FIG. 15B, when section 436 is folded over a portion of section 434, to align materials 402 and 404. In at least one embodiment, the section 436 does not include components similar to 36*a* and 36*b* as in apparatus 1 of FIG. 1A. The material 402 may be components, attachment devices, or materials similar and/or identical to either 36*a* and/or 36*b*. The section 434 includes component 465 which may be similar to or identical to component 65 and 34*a* shown in FIG. 1A.

In at least one embodiment, the section 436 could include components similar to 36*a* and 36*b*.

Figure 15B:
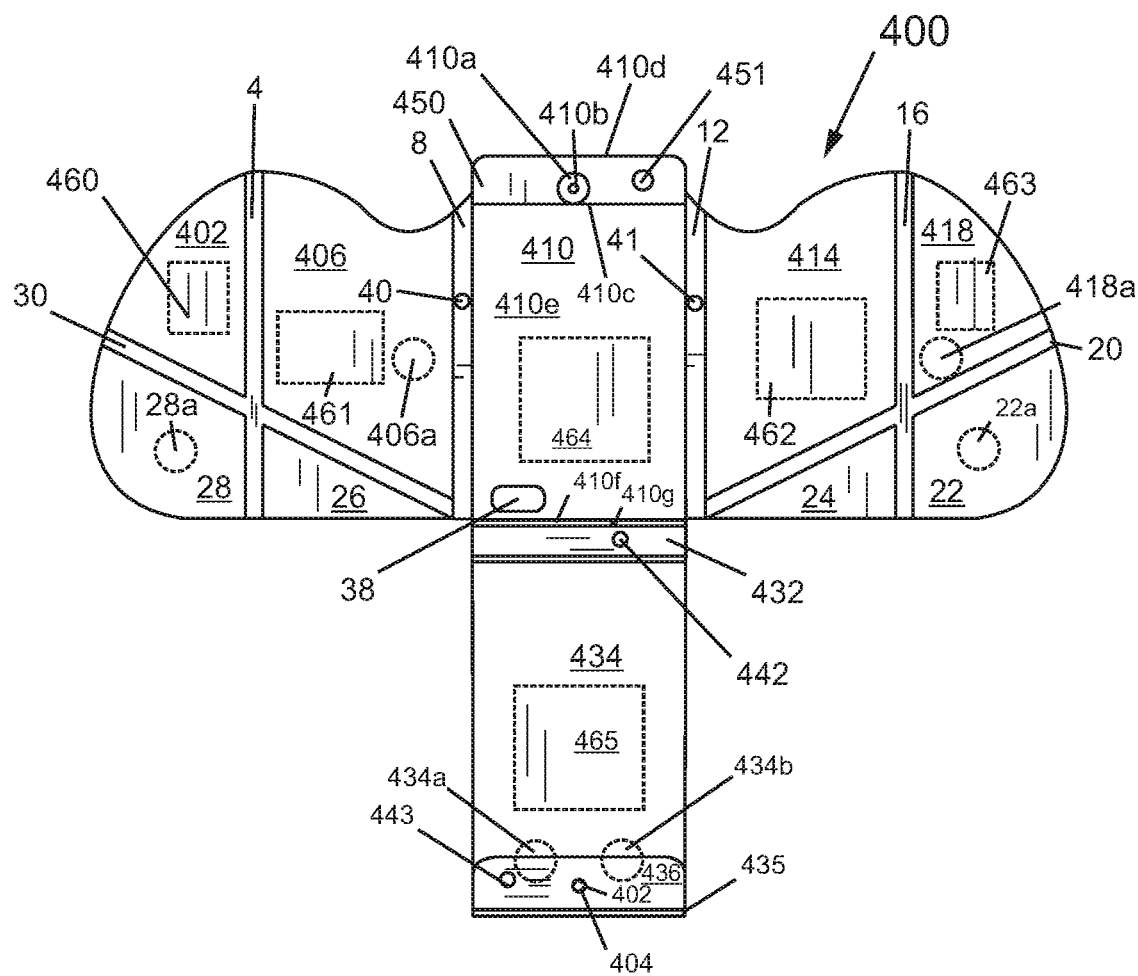
FIG. 15B shows a top view of the apparatus of FIG. 15A shown in a state in which a section has been folded over another section.

FIG. 15B shows a top view of the apparatus of FIG. 15A shown in a state in which section 436 has been folded over part of section 434. Other than the changes mentioned, the apparatus 400 may operate identical to the apparatus 1 as shown in FIGS. 1-14. The components, attachment devices, or materials 402 and 404, help to secure and move the section 436 out of the way when the apparatus 400 is in configurations or states similar and/or identical to that shown in FIGS. 6A-7B for apparatus 1.

FIG. 15A and FIG. 15B also show sections 402, 406, 410, 414, 418, 432, and 434, which may be identical to sections 2, 6, 10, 14, 18, 32, and 34, except as described in this application. Sections 402, 406, 410, 414, 418, 432, and 434 may include an extra layer of material on the inner surface or outer surface of those sections, which more easily permit advertising to be printed on the outer or inner surfaces of sections 402, 406, 410, 414, 418, 432, and 434. For example, sections 402, 406, 410, 414, 418, 432, and 434 may be made of leather, faux leather, polyester, woven fabric or non woven fabric, paper/paper board, synthetic paper, rubber, plastic, silicone, or polyurethane or a sandwich or plurality of layers of one or more of these materials. The section 410 may include components 410a, 410b, 410c, 410d, and 410e which may be similar to or identical to components 10a, 10b, 10c, 10d, and 10e specified for apparatus 1 in FIG. 1A. In other embodiments, sections 402, 4, 406, 8, 410, 12, 414, 16, 418, 20, 22, 24, 26, 28, 30, 432, 434, 435, and 436 may be made of a molded material, such as plastic, polyurethane, thermoplastic polyurethane, polycarbonate, polypropylene, rubber, or any other material that is suitable for a molding process such as, but not limited to blow molding and injection mold 30, 432, 434, 435, and 436 ding. In at least one embodiment sections 402, 4, 406, 8, 410, 12, 414, 16, 418, 20, 22, 24, 26, 28, 30, 432, 434, 435, and 436 may be made of a reflective material that can reflect the sun's rays and heat away from the electronic device and apparatus 400, when in the state of FIGS. 6A, 6B, 7A and 7B.

The apparatus 400 of FIGS. 15A-15B may include solar panels on sections 402, 406 410, 414, 418 and 434 which would be connected to the apparatus 400, to charge the battery of the electronic device when in the states similar or identical to that shown in FIGS. 7A and 7B.

Figure 16A:
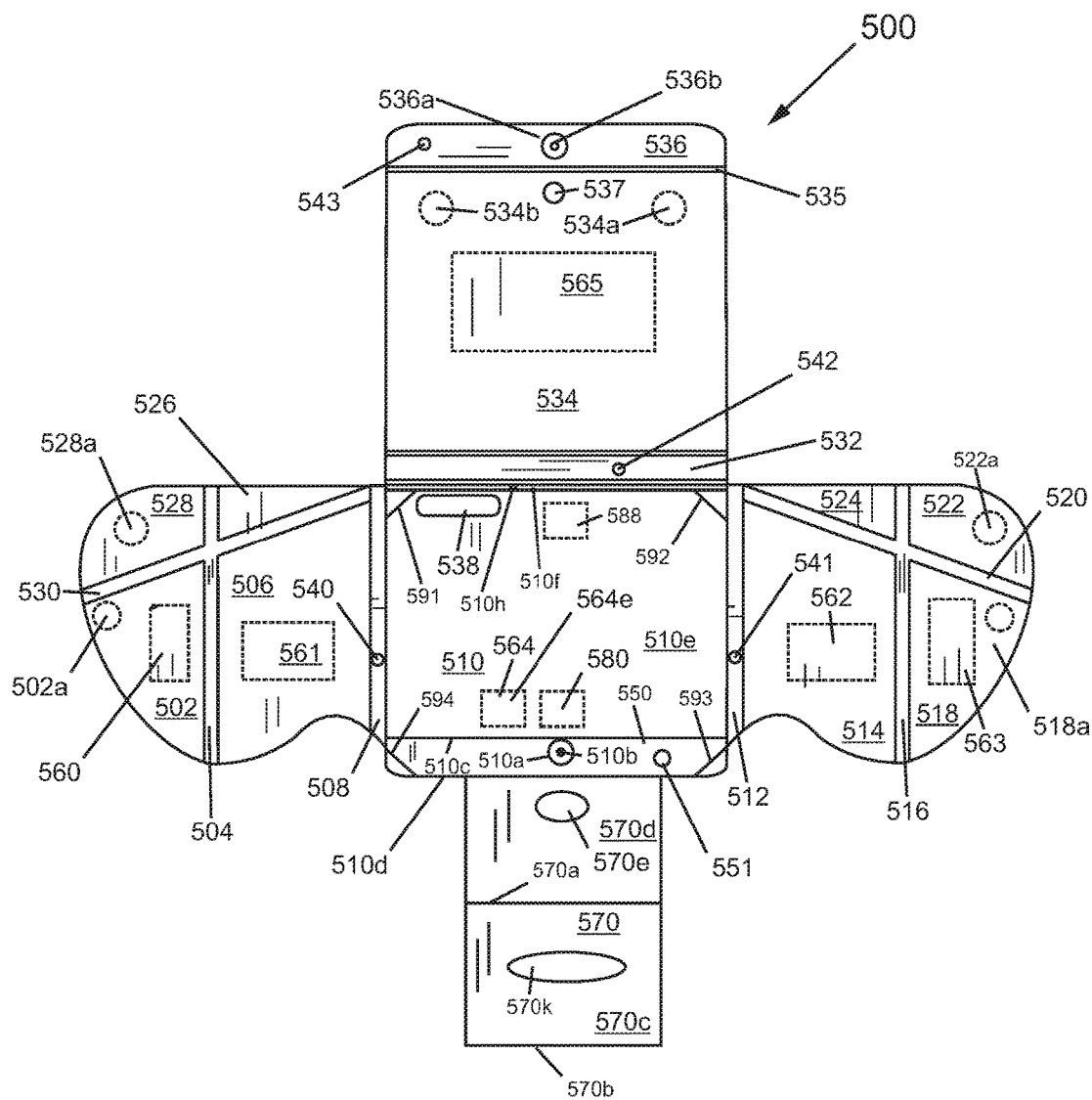
FIG. 16A shows a top view of an apparatus in accordance with another embodiment of the present invention, with the apparatus of FIG. 16A shown in a state in which it is entirely flattened.
Figure 16B:
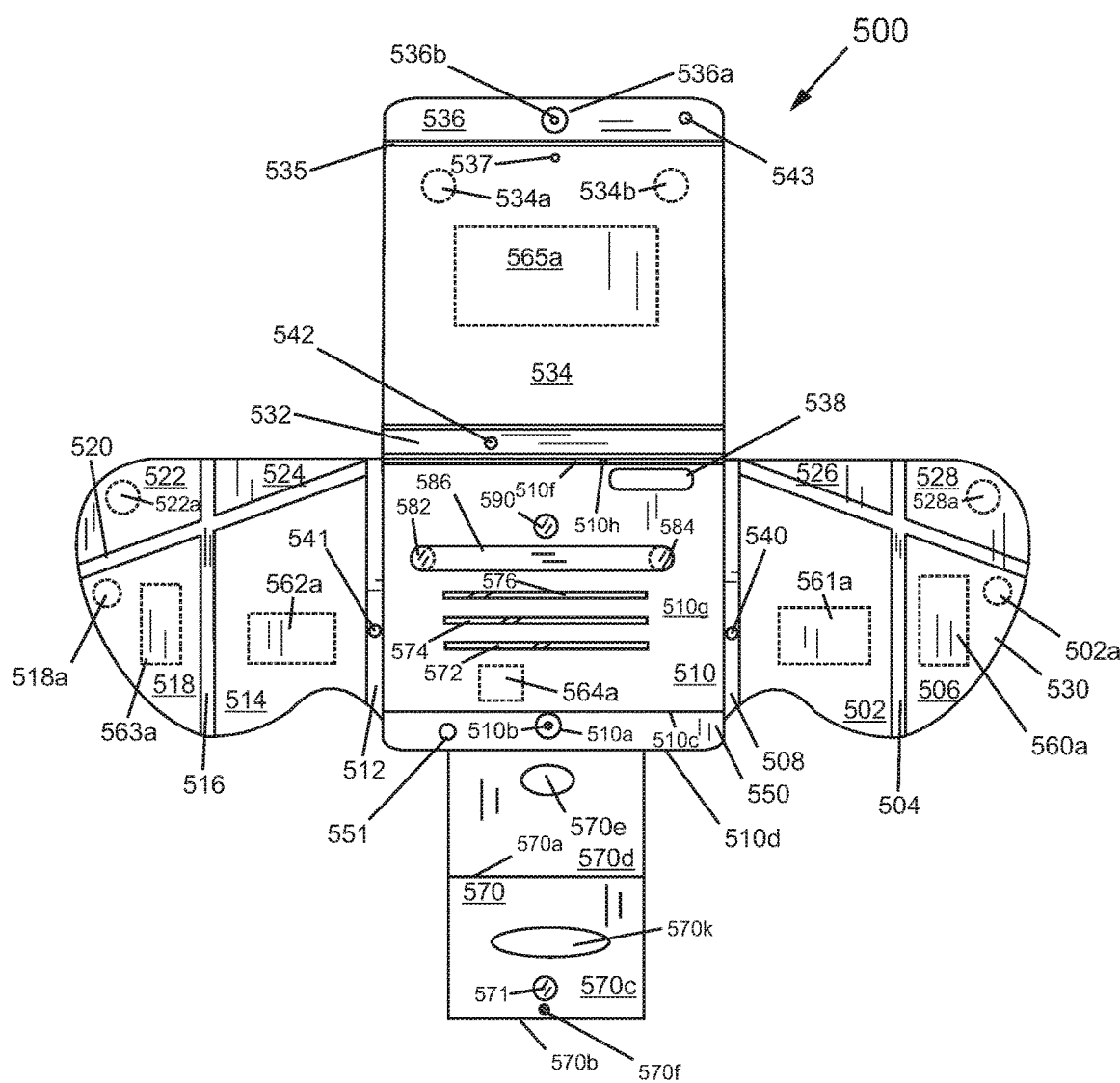
FIG. 16B shows a bottom view of the apparatus of FIG. 16A in the entirely flattened state.
Figure 16C:
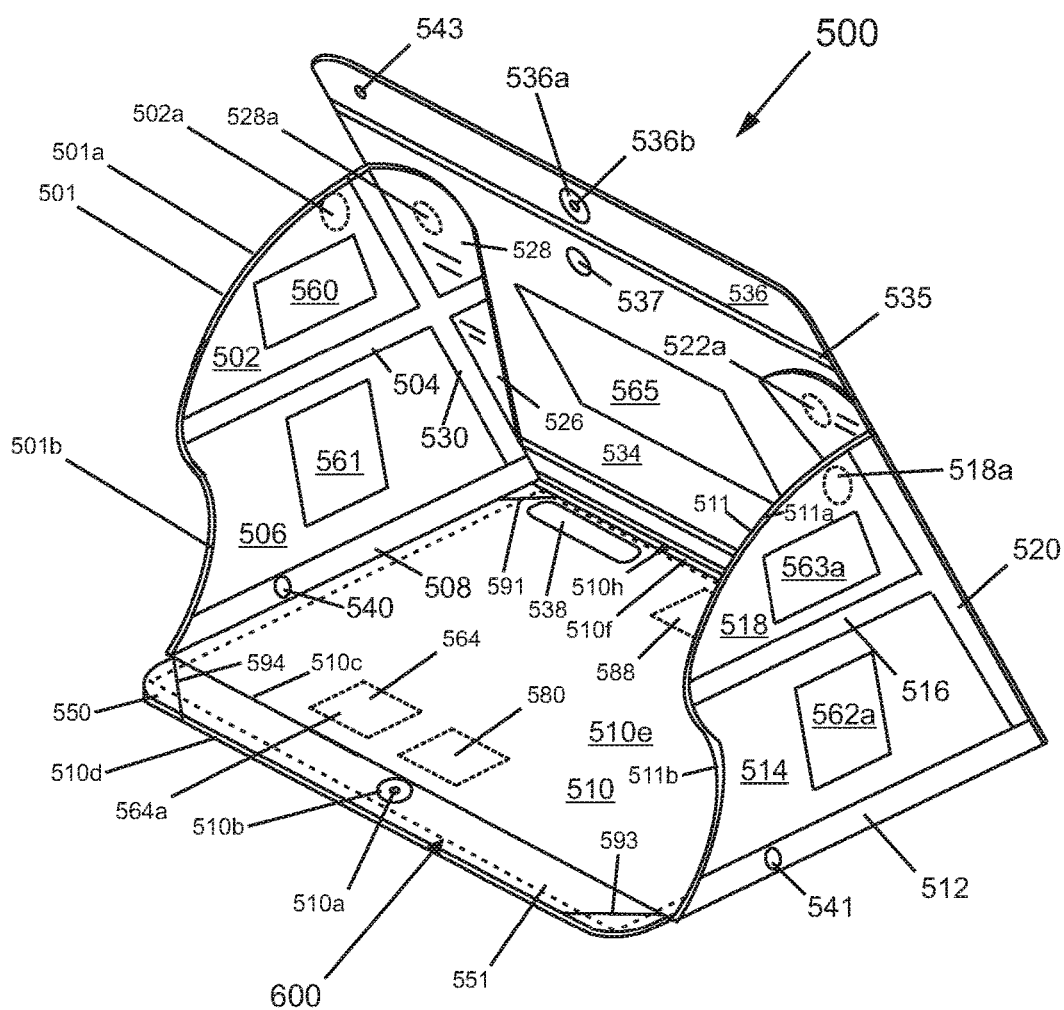
FIG. 16C shows a top, front, and right, perspective view of the apparatus of FIG. 16A in an assembled state, with a portion or section 570 hidden.

The apparatus 500 of FIG. 16A, may include solar panels on sections 502, 506, 510, 514, 518 and 534 which would be connected to device 500, to charge the battery of device 500 when in the states of FIG. 16C.

The apparatus 400 of FIGS. 15A-15B, unlike the apparatus 1 of FIG. 1A, may include two materials or attachment devices 434a and 434b, instead of one magnet or magnetic material 34a as in FIG. 1A. The materials or attachment devices 434a and 434b may be configured to attach to materials or attachment devices 28a and 22a respectively, to keep the apparatus 400 in a state, similar or identical to the state shown in FIG. 6A for the apparatus 1. The materials or attachment devices 434a, 434b, 28a and 22a may be magnets, metallic or magnetic materials, Velcro (trademarked), such as hooks and loops or any other attachment devices or materials.

The apparatus 400 of FIGS. 15A-15B, may also include attachment devices 406a and 418a which are configured to be attached together to attach sections 406 and 418, so when the apparatus 400 is folded in the following manner these two attachment devices 406a and 418a hold the left side wall and right side wall in place and under the first central section 510. In at least one embodiment, section 418 is folded under section 414 and both of these are folded under section 510. Then section 402 is folded under 406 and both of these are folded under sections 418, 414, and 510.

Figure 15C:
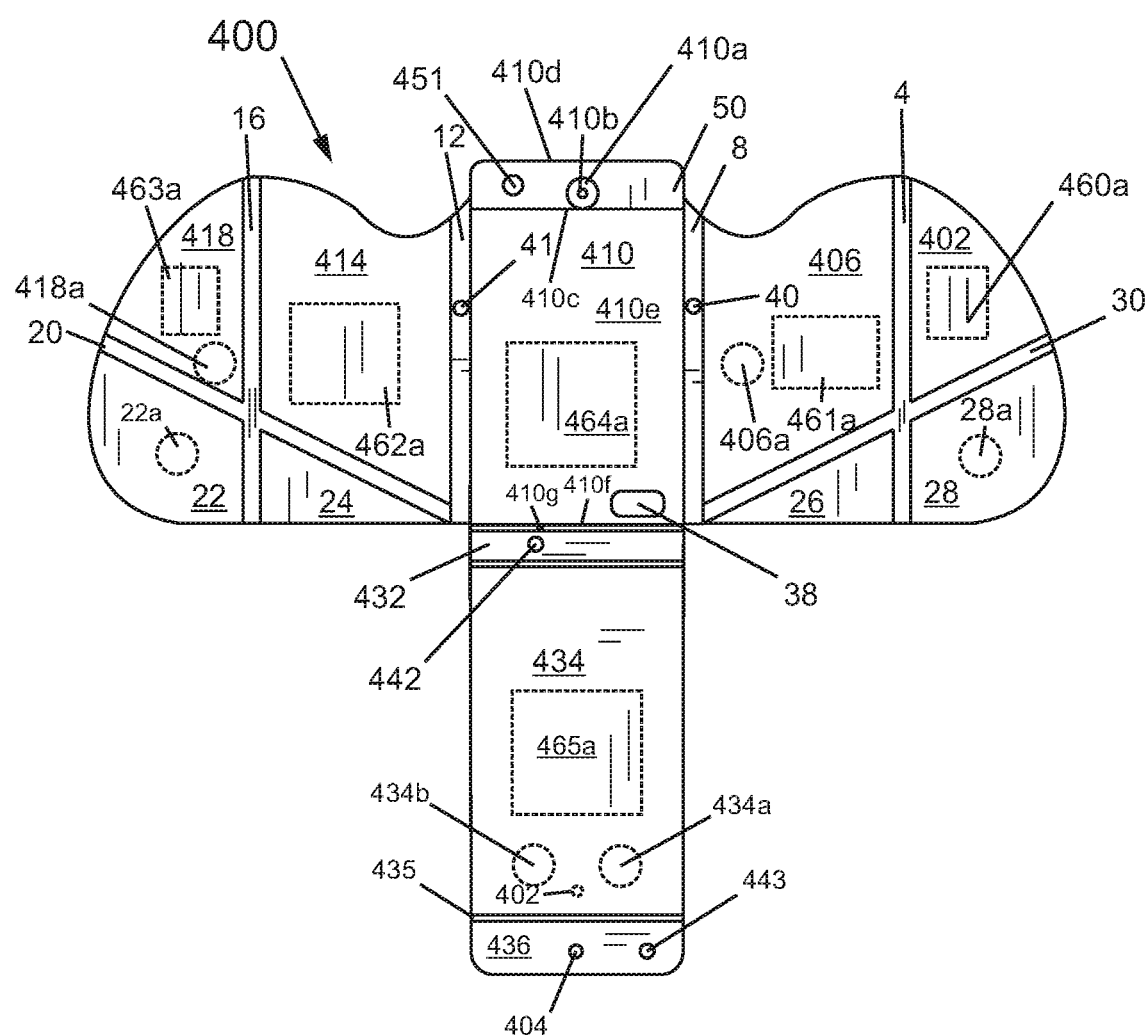
FIG. 15C shows a bottom view of the apparatus of FIG. 15A shown in the state in which it is entirely flattened.

The apparatus 400 may include pockets 460, 461, 462, 463, 464, and 465 on the top surface as shown in FIG. 15A by dashed lines, and may also include additional and separate pockets 460a, 461a, 462a, 463a, 464a, and 465a, shown in FIG. 15C by dashed lines.

The apparatus 400 may include retainer 410f which may be similar or identical in purpose and configuration to the retainer 50 of FIG. 1A and the retainer 510f shown in FIG. 16A. The retainer 410f may have an opening 410g shown in FIGS. 15A-C, wherein the opening 410g which may be similar or identical to the opening 51 in FIG. 1A to allow for access, through the opening 410g, for a wire, or cable to be attached to a mobile communications device or tablet typically located on section 410, when the apparatus 400 is in a state, similar or identical to the state of FIG. 6A, for reasons such as, for the purposes of charging, earbud/earphone jack, speaker, power control, volume control and/or microphone.

The apparatus 400 may include multiple openings on both the top surface and bottom surface of section 434 which would align with components such as a speaker or microphone of the electronic device, to allow sound to not be obstructed or interfered with, when in the state as shown in FIGS. 12, 13A and 13B.

FIG. 16A shows a top view of an apparatus 500 in accordance with another embodiment of the present invention, with the apparatus of FIG. 16A shown in a state in which it is entirely flattened. FIG. 16B shows a bottom view of the apparatus 500 in the entirely flattened state.

The apparatus 500 may be similar and/or identical to the apparatus 1 of FIG. 1A except as will be described in the present application.

The apparatus 500 may include sections 502, 504, 506, 508, 512, 514, 516, 518, 520, 522, 524, 526, 528, and 530, which may be similar to or identical to the sections 2, 4, 6, 8, 12, 14, 16, 18, 20, 22, 24, 26, 28, and 30, respectively, except as described in this application.

The section 510 may be similar or identical to section 10 of the apparatus 1, except that the section 510 has a landscape and/or more square shape than the section 10, and with further exceptions as described in the present application. As shown in FIG. 16A, the section 510 also includes attachment devices 580 and 588 which may be Velcro (trademarked) and/or mating hooks and/or loops, magnets or magnetic material, two sided adhesive pads or some other attachment device for keeping a smart phone, tablet, or mobile communications device, attached to the surface 510e of the section 510. The section 510 may also include a pocket 564, shown by dashed lines, and a top surface 564e.

The section 510 may include an attachment device or material 510b of a device or material 510a of section 510, which may be identical to components 10b and 10a, wherein device 510b can be snapped into or otherwise attached to indentation or other attachment device 536b of device 536a of section 536, to temporarily hold the apparatus 500 in a closed state similar or identical to that as shown in FIG. 12 for apparatus 1. The attachment devices 510a, 510b, and 536a and 536b may be Velcro (trademarked) and/or mating hooks and/or loops, magnets or magnetic material, or some other attachment device for temporarily attaching section 536 to section 510. There may be multiple attachment devices located on section 510 and multiple attachment devices located on section 536. In at least one embodiment, section 536 does not have to be as wide as shown in FIG. 16A. In fact it may be much smaller when the apparatus 500 is manufactured.

In at least one embodiment, section 510 may have a retainer section 550, which may be similar or identical in purpose and configuration to retainer section 50 for apparatus 1, with the exception that section 550 is longer due to square and/or landscape shape of 510. There may be junction line 510c similar or identical to 10c, except 510c is longer than 10c, and an edge 510d similar or identical to 10d, except 510d is longer than 10d. There also may be a retainer 510f shown in FIG. 16A, which may be similar or identical to retainer section 50 shown in FIG. 1A. The retainer 510f may have an opening 510h shown in FIGS. 15A-C, wherein the opening 510h which may be similar or identical to the opening 51 in FIG. 1A to allow for access, through the opening 510h, for a wire, or cable to be attached to a mobile communications device or tablet typically located on section 510, when the apparatus 500 is in a state, similar or identical to the state of FIG. 16C, for reasons such as, for the purposes of charging, earbud/earphone jack, speaker, power control, volume control and/or microphone.

Figure 17A:
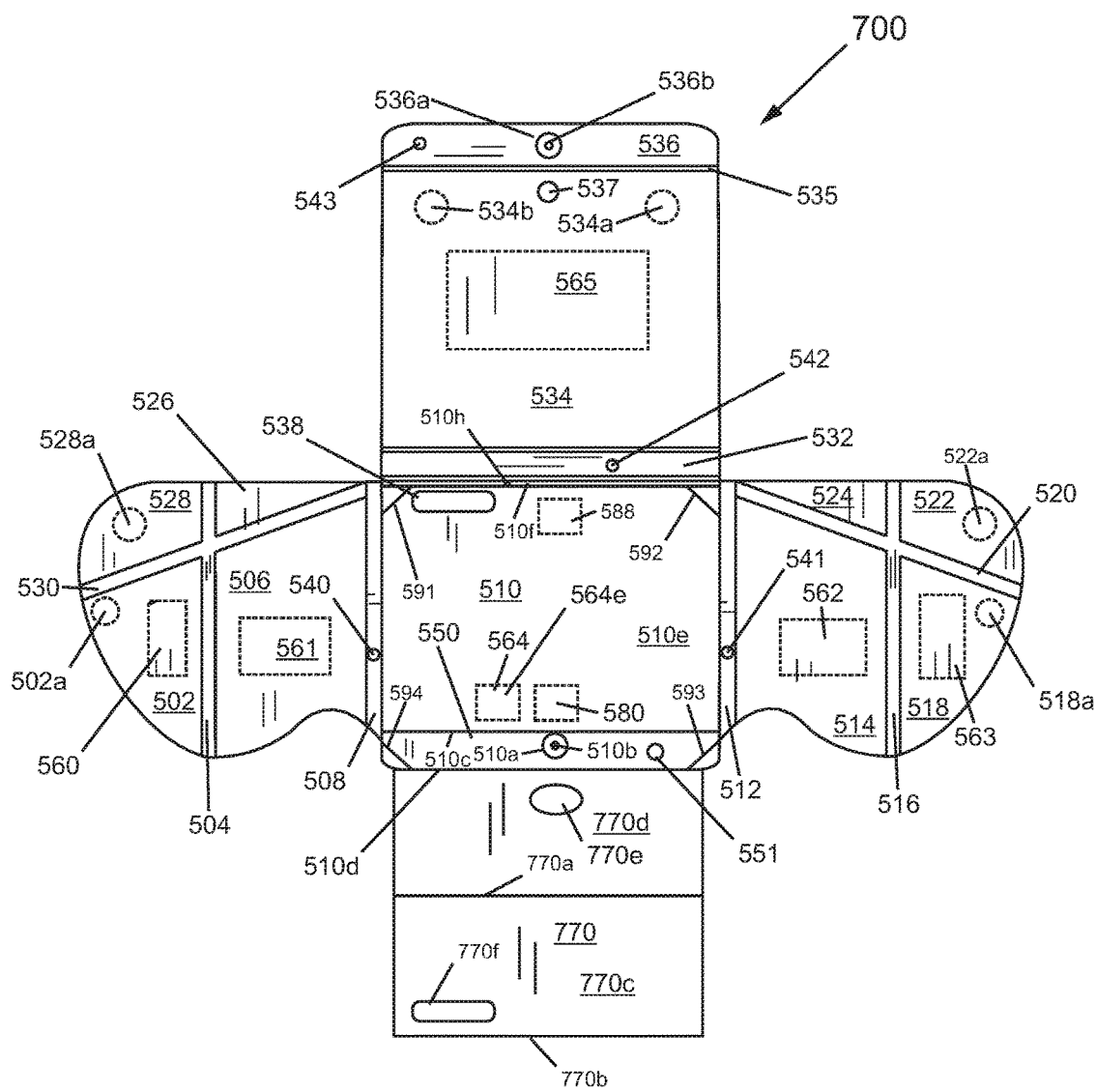
FIG. 17A shows a top view of an apparatus in accordance with another embodiment of the present invention, with the apparatus of FIG. 17A shown in a state in which it is entirely flattened.

In one or more embodiments of the present invention section 510 may include and/or have attached to it, retainers or bands 591, 592, 593, and 594 as shown in FIG. 16A and FIG. 17A. These corner retainers or bands 591, 592, 593, and 594, may be made of a soft material such as, but not limited to elastic that is expandable, or of a harder more rigid material such as, but not limited to metal, plastic or rubber. Each of the four corners of the tablet, smart phone or mobile electronic communications device 600 may be inserted between one of the retainers or bands 591-594 and the surface 510e of section 510 in order to hold the device 600 in place as shown in FIG. 16C where the location of substantially rectangular and/or rectangular box structure device 600 is shown by dashed lines. Typically, at least part of the corner retainers or bands 591-594 contact at least part of the corresponding corner of the device 600 in FIG. 16C. In at least one embodiment, the apparatus 400 may also be made with corner retainers or bands similar or identical to retainers or bands 591-594 attached to section 410. In at least one embodiment, only two of the bands or retainers 591-594, may be needed, such as front bands or retainers 593-594. The two front corner retainers 593-594 may be sufficient enough, in some embodiments, depending on the device 600, to hold the device 600 in place.

Each of the bands or retainers 591-594, may be substantially linear, and each may have first and second short ends which are attached to section 510, and may have middle sections which are substantially larger than the first and second short ends, between the first and second short ends, wherein the middle sections are not attached to the section 510, and can lift off of the section 510, to allow corners of the device 600 to be inserted between the bands or retainers 591-594 and the section 510 and/or the surface 510e.

Figure 16D:
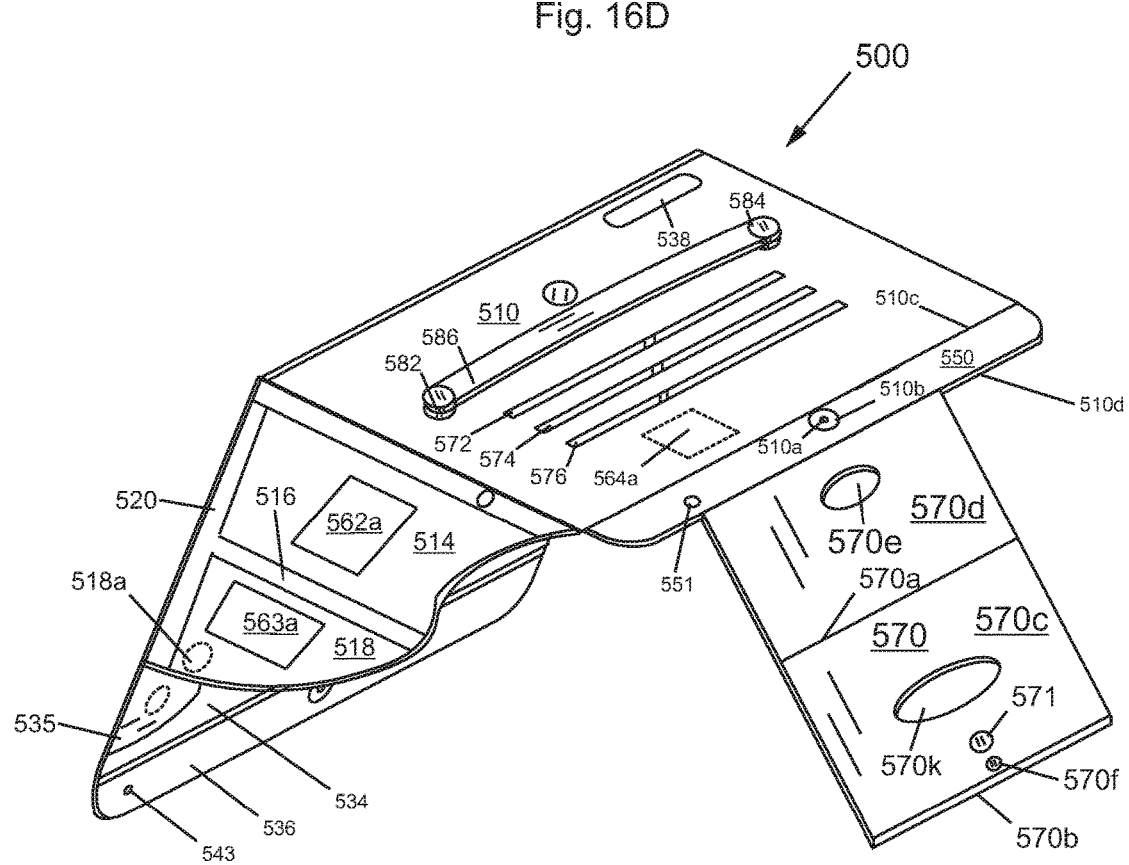
FIG. 16D shows a bottom, right, and front perspective view of the apparatus of FIG. 16A in the assembled state of FIG. 16C, with the portion or section 570 not hidden.
Figure 16E:
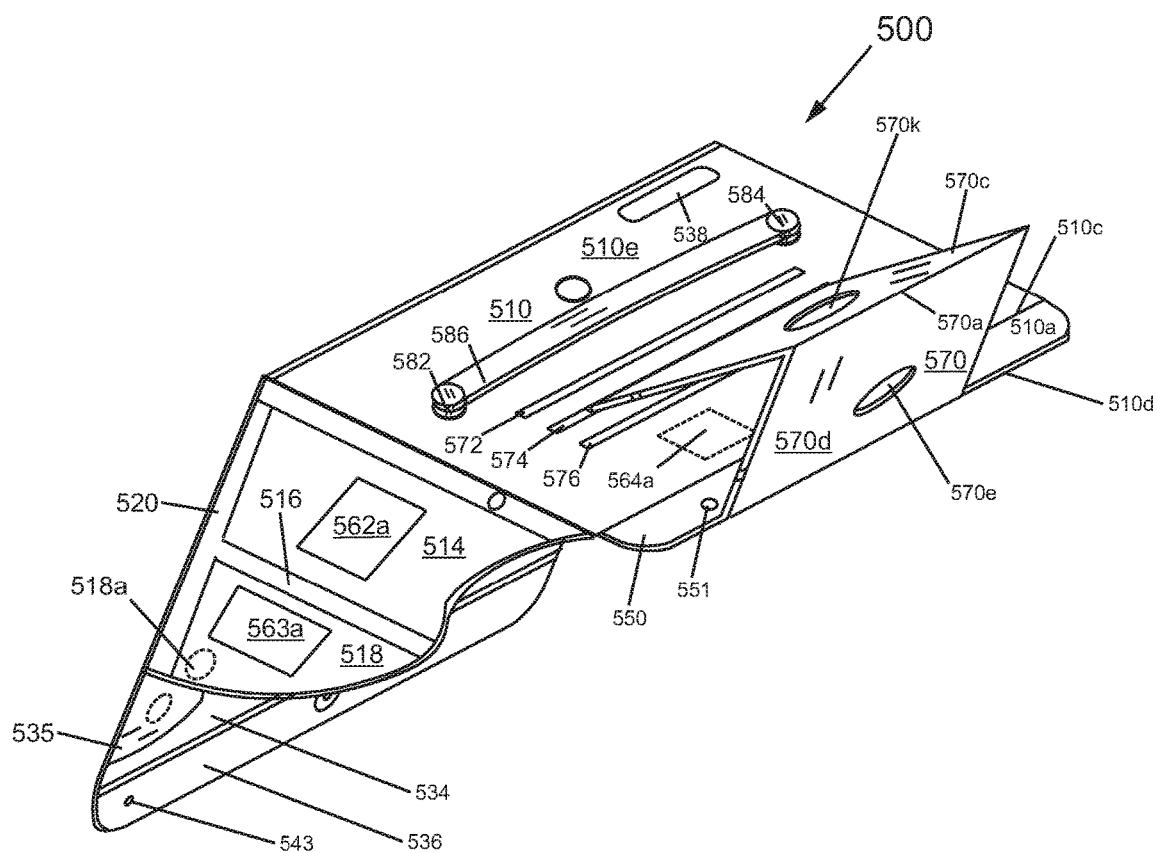
FIG. 16E shows a bottom, right, and front perspective view of the apparatus of FIG. 16A in the assembled state of FIG. 16C, with the portion or section 570 in a first stand position.

The apparatus 500 may include a section or member 570 which may be substantially the same width of 510, or may be substantially less than the width of 510, and the member or section 570 is attached at one end, along edge 510d, to the section 510 through the section 550. The member 570 can be folded or bent and the end or edge 570b can be inserted into one of the indentations or anti-slip grips 572, 574, or 576, shown in FIG. 16B, to provide a stand feature as shown in FIGS. 16E and 16F. For example, as shown in FIG. 16F, the end or edge 570b has been inserted into indentation 574, and this provides a stand feature, allowing the apparatus 500 to stand in the position shown in FIG. 16F, on surface 650, by portion 570d of member 570 being parallel to, in contact with and sitting on surface 650. In the position of FIG. 16F, the portion 570c of the member or section 570 is at an angle with respect to the surface 650.

The apparatus 500 further includes components 538, 540, 541, 542, 543, 551, 560, 561, 562, 563, 564, and 565 which may be similar or identical to components 38, 40, 41, 42, 43, 51, 60, 61, 62, 63, 64, and 65 shown in FIG. 1A for apparatus 1.

The apparatus 500 includes attachment devices 528a and 522a which are configured to attach to attachment devices 534b and 534a, respectively to put the apparatus 500 in the configuration shown in the assembled configuration shown in FIG. 16C, where the sections 528 and 526 are at an angle with respect to the sections 502 and 506 and the sections 522 and 524 are at an angle with respect to the sections 514 and 418. Attachment devices 528a, 528b, 534, and 534b may be magnets or magnetic materials, Velcro (trademarked) such as hooks and loops or any other attachment devices or materials.

A smart phone or tablet computer 600, shown by dashed lines, typically, sits on the surface 510e, as shown in FIG. 16C, and is attached to the surface 510e, parallel or substantially parallel to the surface 510e, by attachment devices 580 and 588, which may be Velcro (trademarked), magnets, or any other known attachment devices. With the smart phone or tablet 600 sitting in this manner on the surface 510e, the section 570d of the stand 570 is placed on the surface 650, substantially parallel or parallel to the surface 650, so that the section 510 and surface 510e are at an angle A1 with respect to the surface 650. The angle A1 may be less than ninety degrees to have the phone or tablet 600 tilted backwards so that apparatus 500 does not tip over. In addition, the angle A1, can be changed by inserting edge 570b into indentation 572, which typically decreases angle A1 from the position where edge 570b is in indentation 574, or changed by inserting edge 570b into indentation 576, which typically increases angle A1, from the position shown in FIG. 16F.

The indentations 570, 572, and 574 may be or may be replaced by anti-slip grips. The indentations 572, 574, and 576 may be or may be replaced by may be grooves, skid plates or some other attachment device such as magnets, magnetic materials, Velcro (trademarked), hooks and loop or some other attachment to attach attachment device 570f to one of 572, 574, or 576, such as when in a state similar to the state of FIG. 16F, where portion 570 forms a stand.

Figure 16G:
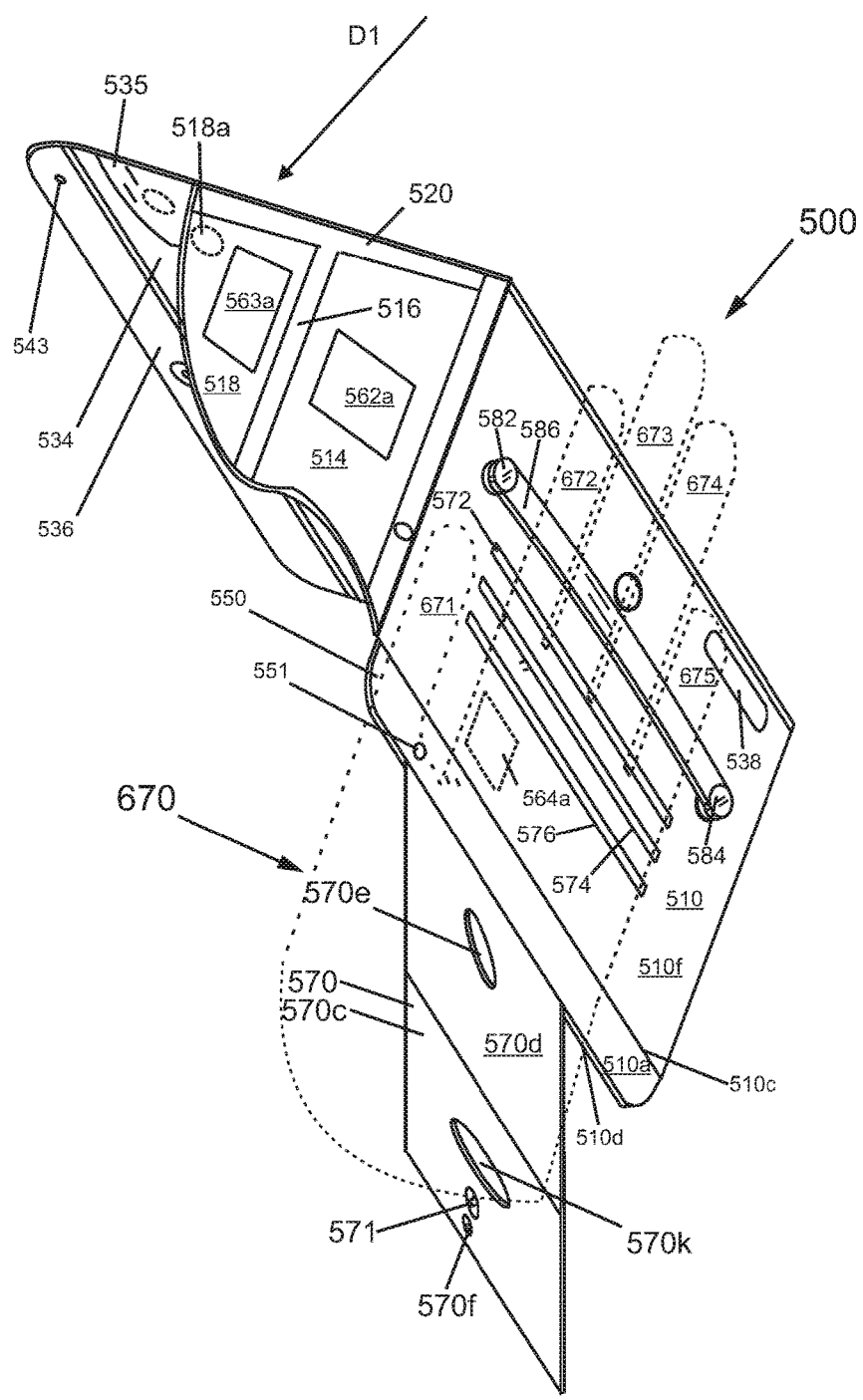
FIG. 16G shows a bottom, right, and front perspective view of the apparatus of FIG. 16A in the assembled state of FIG. 16C, with the portion or section 570 in an extended position, and with a hand shown in dashed lines, holding up the apparatus of FIG. 16A.

FIG. 16C shows a top, front, and right, perspective view of the apparatus 500 in an assembled state, with a portion or section 570 hidden. FIG. 16D shows a bottom, right, and front perspective view of the apparatus 500 in the assembled state of FIG. 16C, with the portion or section 570 not hidden. FIG. 16E shows a bottom, right, and front perspective view of the apparatus 500 in the assembled state of FIG. 16C, with the portion or section 570 in a first stand position. FIG. 16F shows another bottom, right, and front perspective view of the apparatus 500 in the assembled state of FIG. 16C, and with the portion or section 570 in the first stand position of FIG. 16E, and with a flat surface 650 shown in dashed lines, on which part of the section 570 sits. FIG. 16G shows a bottom, right, and front perspective view of the apparatus 500 in the assembled state of FIG. 16C, with the portion or section 570 in an extended position, and with a hand 670 shown in dashed lines, holding up the apparatus 500.

The hand 670 includes thumb 671, and fingers 672, 673, 674, and 675. In at least one embodiment the apparatus 500 is configured so that the fingers 672, 673, 674, and 675 can be inserted between the strap 586 and the bottom surface 510f of the section 510. The thumb 671 then may press on the bottom surface 510f of the section 510. Alternatively, the thumb 671 may be free or could be touching the screen of device 600. Generally, in at least one embodiment, the fingers 672, 673, 674, and 675 may be on the bottom surface 510f, but not the thumb 671. The fingers 672-675 are held by the strap 586 so that one can pick up the apparatus 500, with the phone or tablet 600 attached to surface 510e as described with reference to FIG. 16C, and the section 534 and other sections, shield rays of the sun, such as coming in the direction D1, from someone looking at a screen of the phone or tablet 600.

Figure 16H:
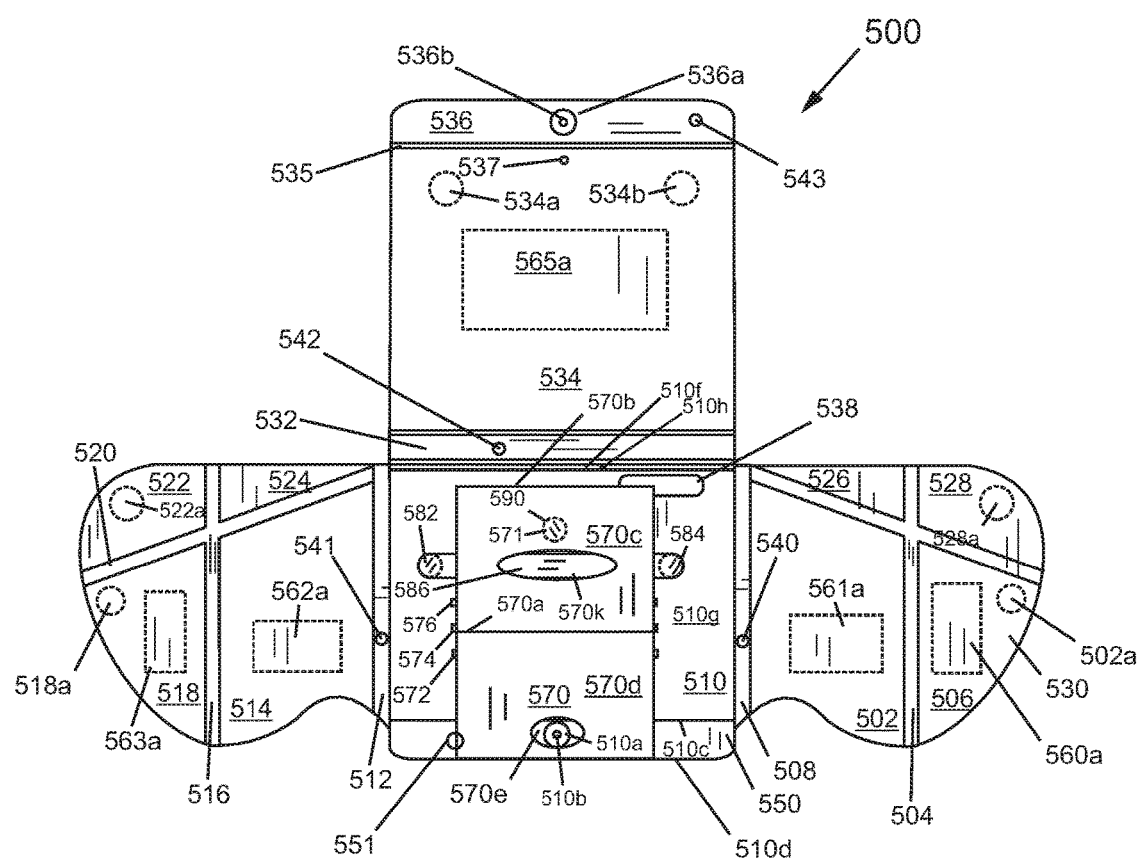
FIG. 16H shows the apparatus of FIG. 16A in the configuration or state of FIG. 16B, except that the section 570 has been folded over a section 510, and is parallel or substantially parallel and on top of the section 510.

In at least one embodiment the portion or section 571, on portion 570c of section 570, shown in FIG. 16B, attaches to section 590 on section 510 to close section 570 onto surface 510g or to make section 570 parallel or substantially parallel to section 510 to temporarily hold section 570 in place, on top of the bottom surface of section 510 or underneath section 510 as shown in FIG. 16H. In addition, in this configuration, opening 570e allows the attachment device 536b of device 536a to attach to attachment device 510b of the section 510 when section 534 is folded over, so that section 534 is parallel or substantially parallel to section 510 and section 570, as shown in FIG. 16I.

The portions or sections 570 or 571 may be called components or attachment devices. Each of the components 570 and 571 may be attachment devices, such as magnets, magnetic materials, Velcro (trademarked) such as hook and/or loops, or any other attachment devices or materials.

Figure 16I:
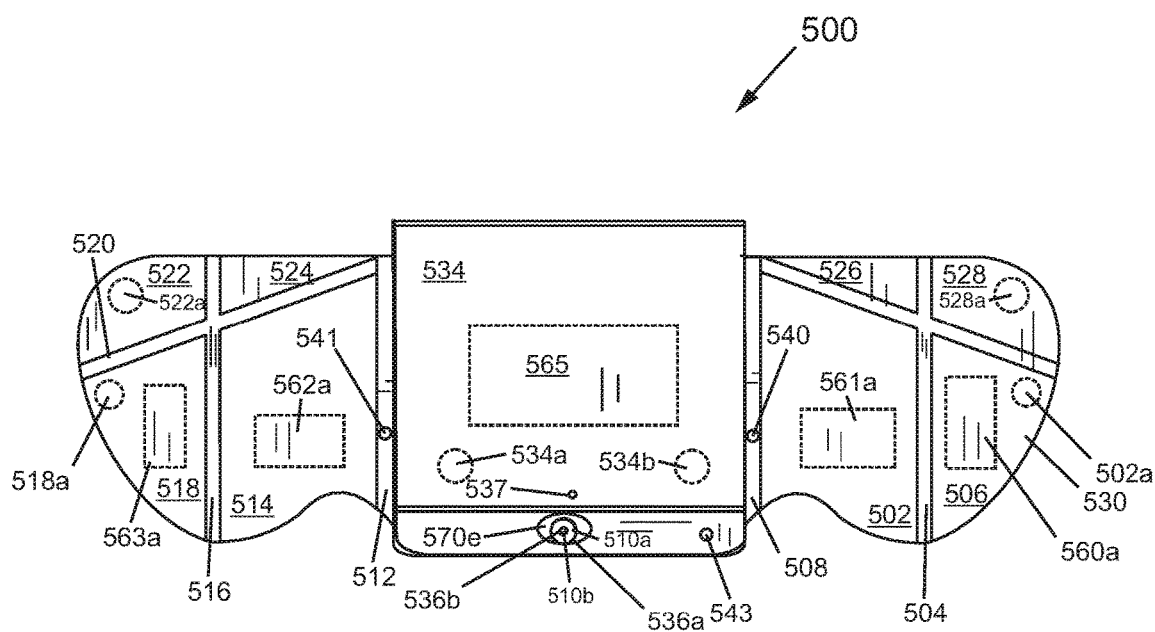
FIG. 16I shows the apparatus of FIG. 16A in the configuration or state of FIG. 16I, except that the section 534 has been folded over sections 510 and 570 and the section 534 is parallel or substantially parallel and on top of the section 510.

In at least one embodiment, the apparatus 500 also includes attachment device 502a and 518a. shown, for example, in FIGS. 16H, 16I, and 17A. The attachment devices 502a and 518a may be magnets, magnetic materials, Velcro (trademarked), hooks and loops or any other attachment device or material. When apparatus 500 is in the state shown in FIG. 16I, the left side wall (includes 522, 524, 518 and 514), and the right side wall (includes 526, 528, 502, and 506) can be folded underneath section 510 and attachment devices 502a and 518a attach to one another to hold the left side wall and the right side wall in place. More specifically, in at least one embodiment, the combination of 522 and 518 will be folded on top of the combination of 524 and 514, and then that folded combination of left side wall (522, 518, 524 and 514) will be folded underneath section 510, so that 522, 524, 518, and 514 will be parallel to section 510. Similarly, in at least one embodiment, the combination of 528 and 506 will be folded on top of the combination of 526 and 502, and then that folded combination of right side wall (528, 506, 526 and 502) will be folded underneath section 510, so that 526, 528, 502, and 506 will be parallel to section 510, and sections 522, 518, 524, and 514, with 502a and 518a attached to each other to hold in this folded state.

In at least one embodiment, section 570 includes an opening 570k, which is configured to align with strap 586, to allow fingers 672-675 to be held by the strap 586, when the section 570 is parallel and overlapping the section 510 as in FIG. 16H. Part of the strap 586 fits through the opening 570k when the section 570 overlaps and is parallel to the section 510 as in FIG. 16H. One or more fingers 672-675 can fit between the strap 586, and the section 570 to hold the apparatus 500 when the apparatus 500 is assembled as in FIG. 16G, except in addition the section 570 is overlapping the section 510 and parallel to the section 510. The strap 586 can be located anywhere on section 510. In at least one embodiment, strap 586 is located in close proximity to section 510c.

The apparatus 500 may include a magnet which can be located anywhere on section 534 that enables it to be in close proximity to the sleep/wake function of mobile electronic device 600, when the device 600 is located in between section 534 and 510 as in the position as shown in FIG. 16I, in order to automatically activate the sleep/wake function. By folding section 534 onto 510 with device 600 in between 534 and 510, the sleep function is automatically activated. The sleep function is a battery saving mode that turns off the screen and/or other functions without completely shutting off the power. Consequently, when section 534 is lifted off of device 600 and placed into the state as shown in FIG. 16C, the wake function is automatically activated and the screen of device 600 automatically turns on and the device 600 powers backup.

FIG. 17A shows a top view of an apparatus 700 in accordance with another embodiment of the present invention, with the apparatus 700 of FIG. 17A shown in a state in which it is entirely flattened. The apparatus 700 may be identical to the apparatus 500 of FIG. 16A, except as described in this application.

The apparatus 700 has a section 770, which is identical to the section 570 of apparatus 500, except as described in this application. The section 770 includes a fold line 770a, an edge 770b, sections or portions 770c and 770d, and an opening 770e, and these components may be identical to components 570a, 570b, 570c, 570d, and 570e, respectively, except that the section 770, portion 770c and portion 770d, are wider than section 570, 570c, and 570d, respectively. The section 770 also includes an opening 770f which is configured to align with opening 538, wherein both openings 770f and 538 are configured to align with a camera lens of a cell phone, tablet, or mobile electronics device such as cell phone, tablet, or mobile electronics or communications device 600, when placed on section 510, is shown in FIG. 16C in dashed lines. The section 770 can be folded underneath the section 510, in order to align the openings 770f and 538 with the camera lens of a cell phone, tablet, or mobile electronics device 600 to allow the camera to be used, while the cell phone is on section 510 as in FIG. 16C, and while the section 770 is parallel or substantially parallel to section 510 and underneath section 510.

In at least one embodiment the opening 538 may be at a different location corresponding to a camera lens of a mobile electronics communications device such as a smart phone or tablet computer. The opening 770f may be moved to a location so that it will align with opening 538. Similarly, the section 570 may have an opening identical or similar to opening 770f to align with an opening similar or identical to 538, but in some embodiments, at a different location depending on the location of a camera lens of a mobile electronics communications device, such as device 600 or some other identical or similar device.

The combination of sections 502, 504, 506, 508, and 530, as shown in the FIG. 16C configuration may be considered a wall, such as a left side wall. The combination of sections 518, 516, 514, 512, and 520, as shown in the FIG. 16C configuration may be considered a wall, such as a right side wall.

In at least one embodiment, the right side wall (combination of sections 502, 504, 506, 508, and 530 shown in FIG. 16C) may have a free edge 501 which is not in contact with either section 510 or section 534 in FIG. 16C, and this free edge 501, may have a portion 501a which is curved outward, and a portion 501b, which is curved inward as shown in FIG. 16C. The portion 501a is curved outwards, in at least one embodiment, to provide more shade from the sun or another light source; and the portion 501b is curved inwards to allow a person to more easily insert a left thumb for texting or selecting fields on a screen of the smart phone or tablet 600.

Similarly or identically, in at least one embodiment, the right side wall (combination of sections 518, 516, 514, 512, and 520 as shown in FIG. 16C) may have a free edge 511 which is not in contact with either section 510 or section 534 in FIG. 16C, and this free edge 511, may have a portion 511a which is curved outward, and a portion 511b, which is curved inward as shown in FIG. 16C. The portion 511a is curved outwards, in at least one embodiment, to provide more shade from the sun or another light source; and the portion 511b is curved inwards to allow a person to more easily insert a right thumb for texting or selecting fields on a screen of the smart phone or tablet 600.

However, in other embodiments, the free edges 501 and 511 may have different configurations. For example each of the free edges 501 and 511 may be a straight line, such as approximately forty-five degrees with respect to section 510, in the configuration of FIG. 16C. Alternatively, a first portion of free edge 501 may be perpendicular to the section 510 and a second portion of the free edge 501 may be perpendicular to the section 534, with the two portions perpendicular to each other, in a squared off configuration. Similarly, or identically, a first portion of free edge 511 may be perpendicular to the section 510 and a second portion of the free edge 511 may be perpendicular to the section 534, with the two portions perpendicular to each other, in a squared off configuration. Generally, the free edges 501 and 511 can be any one of many curvatures and/or shapes.

FIGS. 16E-16F shows a way of folding the section 570 along fold line and inserting an edge 570b into indentation or anti-slip grip 574 to create a stand for apparatus 500, and for the smart phone or tablet 600 located on surface 510e as in FIG. 16C. However, other methods of folding the section 570 and/or of creating a stand are contemplated in accordance with other embodiments of the present invention.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a first central section;
a second central section;
a third central section;
a left side wall; and
a right side wall; and
wherein the first central section, the second central section, the third central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section;
wherein the third central section is attached to the first central section;
wherein the third central section is configured to be folded to provide a stand in the first assembled state, so that the first central section and the mobile electronics device are at an angle with respect to a ground surface, and the mobile electronics device can be viewed, while the second central section, left side wall, and right side wall, provide shade for the mobile electronics device, and a part of the third central section is in contact with the ground surface;
wherein the first central section includes a first attachment device and a second attachment device;
wherein an edge of the third central section is configured to be attached to either the first attachment device or the second attachment device when the third central section is folded to provide the stand in the first assembled state;
wherein the attachment of the edge of the third central section to the first attachment device when the third central section is folded to provide the stand in the first assembled state causes the first central section to be at a first angle with respect to the ground surface; and
wherein the attachment of the edge of the third central section to the second attachment device when the third central section is folded to provide the stand in the first assembled state causes the first central section to be at a second angle with respect to the ground surface, wherein the first angle is different from the second angle.

2. The apparatus of claim 1 wherein
the part of the third central section is parallel to the ground surface when the third central section is configured to be folded to provide a stand in the first assembled state.

3. An apparatus comprising:
a first central section;
a second central section;
a third central section;
a left side wall; and
a right side wall; and
wherein the first central section, the second central section, the third central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section;
wherein the third central section is attached to the first central section;
wherein the first central section includes a first opening through a flat surface of the first central section, and configured to allow a camera lens of the mobile electronics device to be viewed through the first opening of the first central section, when the mobile electronics device is placed on the first central section, and is parallel or substantially parallel to the first central section, wherein the first opening of the first central section is closer to a first end of the first central section than an opposing second end of the first central section;
wherein the first central section includes a second opening through the flat surface of the first central section, and which is closer to the second end of the first central section than to the first end of the first central section; and
wherein the second opening is configured to allow a wire to attach to a port of the mobile electronics device when the mobile electronics device is on the first central section and when the camera lens of the mobile electronics device is aligned with the first opening.

4. The apparatus of claim 1 wherein
the first central section is at an angle of about seventy-five degrees with respect to the second central section in the first assembled state.

5. The apparatus of claim 1 wherein
the apparatus is configured so that the apparatus can alternately be placed in a flat state, in which the first central section, the second central section, the third central section, the left side wall, and the right side wall are located in one plane or placed in the first assembled state.

6. An apparatus comprising:
a first central section;
a second central section;

a third central section;
a left side wall; and
a right side wall; and
wherein the first central section, the second central section, the third central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section;
wherein the third central section is attached to the first central section;
wherein the third central section includes a first attachment device;
wherein the first central section includes a first attachment device; and
wherein the first attachment device of the first central section is configured to attach to the first attachment device of the third central section to hold the first central section to the third central section, so that the first central section and the third central section are parallel to each other, and the first central section completely overlaps the third central section;
wherein the first central section includes a second attachment device;
wherein the second central section includes a first attachment device; and
wherein the third central section includes an opening which allows the second attachment device of the first central section to be accessed through the opening of the third central section, and to attach to the first attachment device of the second central section to thereby attach the second central section to the first central section, when the first central section, the second central section, and the third central section are parallel to each other, and the first central section completely overlaps the third central section, and the first, second, and third central sections overlap each other.

7. An apparatus comprising:
a first central section;
a second central section;
a third central section;
a left side wall; and
a right side wall; and
wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section; and
wherein the third central section is attached to the first central section, so that the third central section can be folded to be placed into a state wherein the first central section completely overlaps the third central section;
wherein the third central section has an opening;
wherein the first central section has a strap attached to it;
wherein at least part of the strap fits through the opening of the third central section when the first central section completely overlaps the third central section, such that a person can insert one or more fingers of the person's hand between the third central section and the strap when the first central section completely overlaps the third central section, in order to carry the apparatus in the first assembled state, so that the screen of the mobile electronics device can be viewed, while the second central section, the left side wall, and the right side wall provide shading to the screen of the mobile electronics device.

8. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section; and
wherein the second central section has first and second parts, and wherein the first part includes a first attachment device and the second part includes a second attachment device;
wherein the first part of the second central section is configured to fold onto the second part of the second central section so that the first attachment device and the second attachment device attach to each other and thereby attach the first part of the second central section to the second part of the second central section, such that the first and second parts are substantially parallel to each other; and
wherein each of the first central section, the second central section, the left side wall, and the right side wall includes a pocket on a top surface and a separate pocket on a bottom surface.

9. The apparatus of claim 8 wherein
wherein the first central section has a retainer which includes an opening; and
wherein in the first assembled state, the apparatus is configured so that a wire can be inserted through the opening of the first central section and attached to a port of the mobile electronics device, while the mobile electronics device is on the first central section, and substantially parallel to the first central section.

10. An apparatus comprising
a first central section;
a second central section;
a left side wall; and
a right side wall; and wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section;

wherein the left side wall includes an attachment device;
wherein the right side wall includes an attachment device;
wherein the second central section includes first and second attachment devices; and wherein the first attachment device of the second central section is configured to attach to the attachment device of the left side wall and the second attachment device of the second central section is configured to attach the attachment device of the right side wall to keep the apparatus in the first assembled state;

wherein in the first assembled state the left side wall is folded so that a first part of the left side wall is at an angle with respect to a second part of the left side wall, and the attachment device of the left side wall is included with the second part of the left side wall;

wherein in the first assembled state the right side wall is folded so that a first part of the right side wall is at an angle with respect to a second part of the right side wall, and the attachment device of the right side wall is included with the second part of the right side wall;

wherein the attachment device of the left side wall is closer to an outer edge of the left side wall than an inner edge of the left side wall, which is opposite the outer edge of the left side wall, wherein the inner edge of the left side wall is contiguous with the first central section;

wherein the attachment device of the right side wall is closer to an outer edge of the right side wall than an inner edge of the right side wall, which is opposite the outer edge of the right side wall, wherein the inner edge of the right side wall is contiguous with the first central section; and wherein both the first attachment device and the second attachment device of the second central section are closer to a first end of the second central section, wherein the first end of the second central section is opposite a second end of the second central section, wherein the second end of the second central section is contiguous with the first central section.

11. An apparatus comprising
a first central section;
a second central section;
a left side wall; and
a right side wall; and
wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section;

wherein the left side wall includes an attachment device;
wherein the right side wall includes an attachment device; and wherein the attachment device of the left side wall is configured to overlap and attach to the attachment device of the right side wall, when the left side wall and the right side wall are parallel to each other and overlap each other, so that at least part of the left side wall is in contact with and parallel to at least part of the right side wall.

12. An apparatus comprising:
a first central section;
a second central section;
a third central section;
a left side wall; and
a right side wall; and
wherein the first central section, the second central section, the left side wall, and the right side wall are attached together in a first assembled state so that the first central section is adjacent to and at a first angle of less than ninety degrees and substantially more than zero degrees with respect to the second central section, and the left side wall and the right side wall are adjacent to and approximately perpendicular to the second central section, and the third central section is parallel to the first central section and so that a mobile electronics device having a screen, can be placed on the first central section, and the screen viewed, with the left side wall, the right side wall, and the second central section providing shading to the mobile electronics device when it is on the first central section;

wherein the apparatus is configured so that the apparatus can alternately be placed in a flat state, in which the first central section, the second central section, the third central section, the left side wall, and the right side wall are located in one plane or placed in the first assembled state; wherein the left side wall is attached along a first linear section to a first folding section, wherein the first linear section is at an angle of less than ninety degrees with respect to the first central section, in the flat state;

wherein the right side wall is attached along a second linear section to a second folding section, wherein the second linear section is at an angle of less than ninety degrees with respect to the first central section, in the flat state; wherein the first central section is attached along a third linear section to the third central section; wherein the third linear section is parallel to both the first central section and the third central section, in the flat state;

wherein the first folding section attaches to the second central section, and the left side wall is at approximately a ninety degree angle with respect to the first folding section, when the apparatus is in the first assembled state;

wherein the second folding section attaches to the second central section, and the right side wall is at approximately a ninety degree angle with respect to the second folding section, when the apparatus is in the first assembled state;

wherein the first linear section is made of a thinner material than a majority of the left side wall, and the second linear section is made of a thinner material than a majority of the right side wall; and wherein the third central section is folded along a fold line and is parallel to the first central section.

13. An apparatus comprising
a first central section
a second central section;
a left side wall; and
a right side wall; and
wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section, and so that a mobile electronics device having a screen, can be placed on the first central section, and the screen viewed, with the left side wall, the right side wall, and the second central section providing shading to the mobile electronics device when it is on the first central section;
wherein the first central section includes first and second corners;
wherein first and second retainers are attached to the first central section at the first and second corners of the first central section, respectively;
wherein the mobile electronics device includes first and second corners which are configured to be inserted between the first and second retainers, respectively, and the first central section to hold the mobile electronics device to the first central section;
wherein the first central section includes a first part and a second part, wherein the first part is substantially rectangular, has three free sides, which are not connected to the left side wall, the right side wall, or the second part of the first central section, and one side which is contiguous with the second part of the first central section; and
wherein the first and second retainers are located in the first part of the first central section.

14. The apparatus of claim 13 wherein
the first central section includes third and fourth corners;
wherein third and fourth retainers are attached to the first central section at the third and fourth corners of the first central section, respectively; and
wherein the mobile electronics device includes third and fourth corners which are configured to be inserted between the third and fourth retainers, respectively, and the first central section to hold the mobile electronics device to the first central section.

15. A method of using an apparatus comprising
placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and
folding a third central section, which is attached to the first central section, to provide a stand in the first assembled state, so that the first central section and the mobile electronics device are at a first angle with respect to a ground surface, and the mobile electronics device can be viewed, while the second central section, left side wall, and right side wall, provide shade for the mobile electronics device, and a part of the third central section is in contact with the ground surface;
and wherein the apparatus includes:
the first central section;
the second central section;
the third central section;
the left side wall; and
the right side wall; and
wherein the first central section, the second central section, the third central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section;
wherein the third central section is attached to the first central section;
and further comprising folding the third central section, to provide a stand in the first assembled state, so that the first central section and the mobile electronics device are at a second angle, which is different from the first angle with respect to the ground surface, and the mobile electronics device can be viewed, while the second central section, left side wall, and right side wall, provide shade for the mobile electronics device, and a part of the third central section is in contact with the ground surface.

16. The method of claim 15 wherein
the first central section is at an angle of about seventy-five degrees with respect to the second central section in the first assembled state.

17. The method of claim 15 wherein
the apparatus is configured so that the apparatus can alternately be placed in a flat state, in which the first central section, the second central section, the third central section, the left side wall, and the right side wall are located in one plane or placed in the first assembled state.

18. The method of claim 15 wherein
the first central section includes a first attachment device and a second attachment device;
wherein an edge of the third central section is configured to be attached to either the first attachment device or the second attachment device when the third central section is folded to provide the stand in the first assembled state;
wherein the attachment of the edge of the third central section to the first attachment device when the third central section is folded to provide the stand in the first assembled state causes the first central section to be at a first angle with respect to the ground surface; and
wherein the attachment of the edge of the third central section to the second attachment device when the third central section is folded to provide the stand in the first assembled state causes the first central section to be at a second angle with respect to the ground surface, wherein the first angle is different from the second angle.

19. The method of claim 15 wherein
the part of the third central section is parallel to the ground surface when the third central section provides a stand in the first assembled state.

20. A method of using an apparatus comprising:
placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and wherein the apparatus includes:
- the first central section;
- the second central section;
- a third central section;
- the left side wall; and
- the right side wall; and wherein the first central section, the second central section, the third central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section;

wherein the third central section is attached to the first central section;

wherein the first central section includes a first opening through a flat surface on the first central section and configured to allow a camera lens of the mobile electronics device to be viewed through the first opening of the first central section, when the mobile electronics device is placed on the first central section, and is parallel or substantially parallel to the first central section, wherein the first opening of the first central section is closer to a first end of the first central section than an opposing second end of the first central section; and wherein the first central section includes a second opening through the flat surface of the first central section, and which is closer to the second end of the first central section than to the first end of the first central section; and wherein the second opening is configured to allow a wire to attach to a port of the mobile electronics device when the mobile electronics device is on the first central section and when the camera lens of the mobile electronics device is aligned with the first opening.

21. A method of using an apparatus comprising:

placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and wherein the apparatus includes:
- the first central section;
- the second central section;
- a third central section;
- the left side wall; and
- the right side wall; and wherein the first central section, the second central section, the third central section, the left side wall, and the right side wall are attached together in a first assembled state so that the first central section is adjacent to and at a first angle of less than ninety degrees and substantially more than zero degrees with respect to the second central section, and the left side wall and the right side wall are adjacent to and approximately perpendicular to the first central section;

wherein the third central section is attached to the first central section;

wherein the third central section includes a first attachment device;

wherein the first central section includes a first attachment device; and wherein the first attachment device of the first central section is configured to attach to the first attachment device of the third central section to hold the first central section to the third central section, so that the first central section and the third central section are parallel to each other, and the first central section completely overlaps the third central section;

wherein the first central section includes a second attachment device;

wherein the second central section includes a first attachment device; and wherein the third central section includes an opening which allows the second attachment device of the first central section to be accessed through the opening of the third central section, and to attach to the first attachment device of the second central section to thereby attach the second central section to the first central section, when the first central section, the second central section, and the third central section are parallel to each other, and the first central section completely overlaps the third central section, and the first, second, and third central sections overlap each other.

22. A method of using an apparatus comprising:

placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and inserting one or more fingers of a person's hand between the first central section and a strap, attached to the first central section, in order to carry the apparatus in the first assembled state, so that the screen of the mobile electronics device can be viewed, while the second central section, the left side wall, and the right side wall provide shading to the screen of the mobile electronics device; and wherein the apparatus includes:
- the first central section;
- the second central section;
- a third central section;
- the left side wall; and
- the right side wall; and wherein the first central section, the second central section, the left side wall, and the right side wall are attached together in the first assembled state so that the first central section is adjacent to and at an angle of less than ninety degrees and substantially more than zero degrees with respect to the second central section, and the left side wall and the right side wall are adjacent to and approximately perpendicular to the first central section;

wherein the third central section is attached to the first central section, so that the third central section can be folded to be placed into a state wherein the first central section completely overlaps the third central section;

wherein the third central section has an opening;

wherein at least part of the strap fits through the opening of the third central section when the first central section completely overlaps the third central section, such that a person can insert one or more fingers of the person's hand between the third central section and the strap when the first central section completely overlaps the third central section, in order to carry the apparatus in the first assembled state, so that the screen of the mobile electronics device can be viewed, while the second central section, the left side wall, and the right side wall provide shading to the screen of the mobile electronics device.

23. A method of using an apparatus comprising:

placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and wherein the apparatus includes:
the first central section;
the second central section;
the left side wall; and
the right side wall; and wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section;

wherein the second central section has first and second parts, and wherein the first part includes a first attachment device and the second part includes a second attachment device;

wherein the first part of the second central section is configured to fold onto the second part of the second central section so that the first attachment device and the second attachment device attach to each other and thereby attach the first part of the second central section to the second part of the second central section, such that the first and second parts are substantially parallel to each other; and wherein each of the first central section, the second central section, the left side wall, and the right side wall includes a pocket on a top surface and a separate pocket on a bottom surface.

24. The method of claim 23 wherein wherein the first central section has a retainer which includes an opening; and wherein in the first assembled state, the apparatus is configured so that a wire can be inserted through the opening of the first central section and attached to a port of the mobile electronics device, while the mobile electronics device is on the first central section, and substantially parallel to the first central section.

25. A method of using an apparatus comprising:

placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and wherein the apparatus includes:
the first central section;
the second central section;
a third central section;
the left side wall; and
the right side wall; and wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section;

wherein the left side wall includes an attachment device;
wherein the right side wall includes an attachment device;
wherein the second central section includes first and second attachment devices; and wherein the first attachment device of the second central section is configured to attach to the attachment device of the left side wall and the second attachment device of the second central section is configured to attach the attachment device of the right side wall to keep the apparatus in the first assembled state wherein in the first assembled state the left side wall is folded so that a first part of the left side wall is at an angle with respect to a second part of the left side wall, and the attachment device of the left side wall is included with the second part of the left side wall;

wherein in the first assembled state the right side wall is folded so that a first part of the right side wall is at an angle with respect to a second part of the right side wall, and the attachment device of the right side wall is included with the second part of the right side wall;

wherein the attachment device of the left side wall is closer to an outer edge of the left side wall than an inner edge of the left side wall, which is opposite the outer edge of the left side wall, wherein the inner edge of the left side wall is contiguous with the first central section;

wherein the attachment device of the right side wall is closer to an outer edge of the right side wall than an inner edge of the right side wall, which is opposite the outer edge of the right side wall, wherein the inner edge of the right side wall is contiguous with the first central section; and wherein both the first attachment device and the second attachment device of the second central section are closer to a first end of the second central section, wherein the first end of the second central section is opposite a second end of the second central section, wherein the second end of the second central section is contiguous with the first central section.

26. A method of using an apparatus comprising:

placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and wherein the apparatus includes:
the first central section;
the second central section;
a third central section;
the left side wall; and
the right side wall; and wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section;

wherein the left side wall includes an attachment device;

wherein the right side wall includes an attachment device; and wherein the attachment device of the left side wall is configured to overlap and attach to the attachment device of the right side wall, when the left side wall and the right side wall are parallel to each other and overlap each other, so that at least part of the left side wall is in contact with and parallel to at least part of the right side wall.

27. A method of using an apparatus comprising:

placing a mobile electronics device having a screen, on a first central section of the apparatus when the apparatus is in a first assembled state, so that the screen can be viewed, with a left side wall, a right side wall, and a second central section providing shading to the mobile electronics device when the mobile electronics device is on the first central section; and wherein the apparatus includes:
  the first central section;
  the second central section;
  a third central section;
  the left side wall; and
  the right side wall; and wherein the first central section, the second central section, the left side wall, and the right side wall are attached together in a first assembled state so that the first central section is adjacent to and at an angle of less than ninety degrees and substantially more than zero degrees with respect to the second central section, and the left side wall and the right side wall are adjacent to and approximately perpendicular to the first central section;

wherein the first central section includes first and second corners;

wherein first and second retainers are attached to the first central section at the first and second corners of the first central section, respectively;

wherein the mobile electronics device includes first and second corners which are configured to be inserted between the first and second retainers, respectively, and the first central section to hold the mobile electronics device to the first central section;

wherein the first central section includes a first part and a second part, wherein the first part is substantially rectangular, has three free sides, which are not connected to the left side wall, the right side wall, or the second part of the first central section, and one side which is contiguous with the second part of the first central section; and wherein the first and second retainers are located in the first part of the first central section.

28. The method of claim 27 wherein the first central section includes third and fourth corners;

wherein third and fourth retainers are attached to the first central section at the third and fourth corners of the first central section, respectively; and wherein the mobile electronics device includes third and fourth corners which are configured to be inserted between the third and fourth retainers, respectively, and the first central section to hold the mobile electronics device to the first central section.

* * * * *